United States Patent [19]

Hoffman et al.

[11] Patent Number: 5,351,203
[45] Date of Patent: Sep. 27, 1994

[54] ONLINE TOMOGRAPHIC GAUGING OF SHEET METAL

[75] Inventors: Carvel D. Hoffman, Bethlehem; Charles J. Romberger, Coopersburg, both of Pa.; Hunter Ellinger; Thomas W. Stephens, both of Austin, Tex.; Richard D. Savage, San Jose, Calif.

[73] Assignees: Bethlehem Steel Corporation, Bethlehem, Pa.; Scientific Measurement Systems, Inc., Austin, Tex.

[21] Appl. No.: 924,105

[22] Filed: Aug. 3, 1992

[51] Int. Cl.$^5$ ............................................. G01B 15/00
[52] U.S. Cl. .................................. 364/560; 364/562; 364/563; 364/472; 378/9; 378/15
[58] Field of Search ............... 364/560, 561, 562, 563, 364/564, 472; 378/9, 10, 15, 56

[56] References Cited

U.S. PATENT DOCUMENTS

| | | | |
|---|---|---|---|
| 3,955,086 | 5/1976 | Tsujii et al. | 364/563 |
| 4,047,036 | 9/1977 | Smith et al. | 378/56 |
| 4,246,784 | 1/1981 | Bowen | 374/117 |
| 4,284,895 | 8/1981 | Morgan et al. | 378/9 |
| 4,437,006 | 3/1984 | Morgan et al. | 250/363.02 |
| 4,463,758 | 8/1984 | Patil et al. | 606/130 |
| 4,495,635 | 1/1985 | Dobbs | 378/56 |
| 4,510,577 | 4/1985 | Tsujii et al. | 364/563 |
| 4,725,963 | 2/1988 | Taylor et al. | 364/507 |
| 4,751,391 | 6/1988 | Eberhard et al. | 250/385.1 |
| 4,773,029 | 9/1988 | Claesson et al. | 364/564 |
| 4,951,222 | 8/1990 | Hoffman et al. | 364/507 |
| 5,042,015 | 8/1991 | Stringer | 364/564 |
| 5,091,862 | 2/1992 | Hoffman et al. | 364/507 |

OTHER PUBLICATIONS

Isotope Measuring Systems Ltd.'s brochure printed Sep. 1990 in Fed. Rep. of Germany.

E. L. Mangan et al., "X-Ray Thickness Gages for Bethlehem Steel's Computer Controlled Hot Strip Mills", paper presented at the Association of Iron and Steel Engineers Rolling Mill Conference, Baltimore, Md., on May 4 and 5, 1970.

Association of Iron & Steel Engineers, *Hot Strip Mill Profile and Flatness Study Phase II*, pp. 28–58 (Jul. 1989).

D. Wiese, "Improving Quality with Optoelectronic Measurement", in *Tooling and Production*, vol. 49, pp. 72–77 (Apr. 1983).

D. W. Adams, "On-Line Measurement of Hot Strip Profile", in *Steel Times*, vol. 207, No. 2, pp. 135–136 (Feb. 1979).

R. Pirlet et al., "A Noncontact Systems for Measuring Hot Strip Flatness", in *Iron and Steel Engineer*, vol. 60, No. 7, pp. 45–50 (Jul. 1983).

B. D. Sawicka et al., "CT Scanning in Industrial Applications for Testing the Quality of Materials", *16th Symposium on Non-Destructive Evaluation,* pp. 264–271 (Apr. 1987).

T. Kanamori et al., "Application of Gamma Ray Computer Tomography to Non-Destructive Testing", *Nuc. Engineering and Design*, vol. 94, No. 3, pp. 421–426 (1986).

I. Taguchi et al., "Development of High-Energy X-Ray Computer Tomographic Scanner and Its Application to Analysis of Iron and Steel", in *Nippon Steel Technical Report*, No. 33, pp. 22–27 (Apr. 1987).

(List continued on next page.)

*Primary Examiner*—Jack B. Harvey
*Assistant Examiner*—Kyle J. Choi
*Attorney, Agent, or Firm*—Ratner & Prestia

[57] ABSTRACT

The present invention relates to a computer tomography system which measures the thickness and edge position of hot-rolled steel. X-rays produced by two X-ray sources are directed, through the sample being measured, to a plurality of radiation detectors. The radiation detectors measure the attenuation of the X-rays caused by the sample. The attenuation levels sensed by each detector are correlated with each detector's physical location. This information is collected as each X-ray source illuminates the radiation detectors. The collected information is triangulated or averaged, as necessary, to determine the dimensions and position of the measured sample.

36 Claims, 22 Drawing Sheets

OTHER PUBLICATIONS

S. Matsuura et al., "Industrial X-Ray CT Scanner", in *WCNDT*, pp. 693–700 (1985).

I. Taguchi et al., "Industrial X-ray CT Scanner for Steel", in *WCNDT*, pp. 672–679 (1985).

M. Page, "How Gaging Is Helping Steel Measure Its Quality", in *Iron Age*, vol. 227, No. 16, pp. 57–58 (Aug. 1984).

R. L. Tapping et al., "Computer Assisted Tomography for the Non-Destructive Evaulation of Hydrogen-Induced Cracking in Steel", in *Atomic Energy of Canada Limited*, (Jun. 1986).

R. M. Polichar et al., "X-Ray Computed Tomography of Thick Steel Castings and Forgings", in *American Society for Metals*, pp. 275–279 (May 1982).

Y. Ikeda et al., "Neutron Computed Tomography with a High-Speed Image Processor", in *Materials Evaluation*, vol. 46, No. 11, pp. 1171–1176 (Oct. 1988).

W. B. Gilboy et al., "Industrial Applications of Computerized Tomography with X- and Gamma-Radiation", *Research Techniques in Nondestructive Testing*, vol. VI, pp. 255–287.

R. Pirlet et al., "The Rometer, A Non-Contact System for Measuring Device for Hot Strip Mills", *International Conf. Steel Rolling*, vol. 1, pp. 391–398 (Sep. 1980).

R. Pirlet et al., "The Rometer, A Non-Contact System for Measuring Hot Strip Flatness", *Online Inspection of Steel Products*, pp. 79–94 (May 1983).

I. Taguchi et al., "Development of X-Ray Computed Tomographic Scanner for Iron and Steel", in *Journal of Iron & Steel Institute, Japan*, vol. 71, No. 14, pp. 1685–1691 (Oct. 1985), (abstract).

I. Taguchi et al., "Analysis of Raw Materials for Iron and Steel with X-Ray Computed Tomographic Scanner", in *Journal of Iron & Steel Institute, Japan*, vol. 72, No. 10, pp. 1629–1636 (Aug. 1986), (abstract).

S. Myoshi et al., "The Evaluation of SCC Defects of Steel Pipe Using a High-Energy X-Ray CT Scanner", in *Nuclear Engineering Design*, vol. 103, No. 3, pp. 275–287 (Jul. 1987).

Y. Aiba et al., "Development of Industrial X-Ray Computed Tomography and Its Application to Refractories", *Transactions Iron and Steel Institute, Japan*, vol. 26, No. 3, pp. 236–243, (1986).

H. Wadley et al., "Ultrasonic Measurement of Internal Temperature Distribution", *Phil. Trans. R. Soc.* (London), A 320 (1554), pp. 341–361 (Nov. 1986).

D. Kramer, "Ultrasonic Techniques Developed to Measure Internal Temperature of Hot, Just-Cast Steel", in *American Metal Market/Metalworking News*, vol. 11, No. 6, p. 11 (Feb. 1984).

F. Boggiani et al., "Syntom II: A New Phased Array Ultrasonic Inspection System", in *Non-Destructive Testing* (Proc. 12th World Conference), vol. 1, pp. 245–247 (Apr. 1989).

G. Engl et al., "Ultrasonic Inspection Using Phased Array Techniques", *Modern Power Systems*, vol. 10, No. 3, pp. 49–51 (1990).

J. Ylitalo, "Coherent Ultrasound Tomographies for Cross-Sectional Viewing", *Anglo-Finnish Joint Symp. on Advances in Non-Destructive Testing*, pp. 92–106 (May 1988).

"Steel Industry and NBS to Develop Process Control Sensors", in *Journal of Metals*, (Aug. 1983).

H. Sijun et al., "The Application of Image Processing Techniques in Automatic Radiographic Inspections", in *Non-Destructive Testing*, vol. 11, No. 4 (Apr. 1989), (abstract).

ONLINE TOMOGRAPHIC GAUGING OF SHEET METAL

BACKGROUND OF THE INVENTION

1. Field of the Invention

This invention relates to the field of computer tomography and more specifically to the use of computer tomography with the manufacturing of metal. In particular, a computer tomography system is disclosed for measuring a variety of dimensions associated with a metal sample.

2. Background Art

As part of the steel manufacturing process, a variety of methods have been used to determine various dimensions (including the height, width, thickness and surface flatness) of the finished product. These methods typically rely upon one of two technologies: optics and radiation.

Optics (and optoelectronics) have been used in various industries to determine object dimensions. For example, in a system disclosed by Wiese, ("Improving Quality with Optoelectronic Measurement" *Tooling and Production*, Vol. 49, pp 72–77, April 1983) various optoelectronic sensing techniques are described for use in metal working and manufacturing. One of the techniques measures the flatness of hot steel strips by triangulation of reflected light rays. Another technique measures the thickness of strip steel by separately triangulating the light rays reflected from the top and bottom surface of the steel sheet.

A further example of an optical system is disclosed by Pirlet ("A Noncontact System for Measuring Hot Strip Flatness", *Iron and Steel Engineer*, Vol. No. 7, pp 45–50, 1983). In this reference, an optical system is described which measures the flatness of sheet metal in a hot strip finishing mill. The system reflects light supplied by multiple helium-neon lasers from the steel sheet onto corresponding photodiode arrays to triangulate the position of the surface of the steel sheet along three to five lines that run the length of the sheet.

While optics systems have typically achieved good results in a variety of applications, optic systems are not well suited for the steel manufacturing environment. This environment creates a large amount of dust and dirt which can easily interfere with optical sensing. Thus, many steel manufacturers have attempted to obtain measurements of their finished product by using beams of high energy radiation and radiation detectors to determine product dimensions.

One prior art system disclosed in Smith (U.S. Pat. No. 4,047,036) relates to a thickness gauge in which two partially overlapping antiphasal fan beams of radiation are directed towards an object to determine the thickness of the object. An array of scintillation detectors below the object detects the radiation from the two fan beams.

Another prior art system (Adams "On-Line Measurement of Hot Strip Profile", *Steel Times*, Vol. 207, No. 2, pp 135–136, February 1979) also uses radiation to determine the thickness of the object. This system uses a fixed C-frame center line gauge and a traversing gauge to generate a zigzag thickness profile. In the time it takes to completely traverse the width of the object several hundred feet of the object may have passed the gauge. Thus, a considerable portion of the object is not examined.

A further prior art system disclosed by Kanamori ("Application of Gamma Ray Computed Tomography to Non-Destructive Testing" *Nuclear Engineering and Design*, Vol. 94, No.3, pp 421–426, 1986) uses a gamma ray computer tomography (CT) scanner which employs a fan beam of gamma rays that is extendable up to 20 degrees, and a 20 channel gamma ray scintillation detector that has a counting rate of up to $10^5$ per second. This system is limited to the inspection of low density materials such as plastics, ceramics and aluminum.

In a system disclosed by Matsuura ("Industrial. X-ray CT Scanner", *WCNDT*, pp 693–700, 1985) two industrial CT scanners are used to determine the dimensions of the object. One has a 140 KV X-ray source for use with ceramics, plastics, rubber and aluminum products and one with a 420 KV X-ray source for use with zirconia, ceramics, and steel. Both of the scanners employ a fixed source and a fixed array of 512 high pressure xenon detectors. The object to be imaged is placed on a rotating table between the source and the detector array. Thus, the system is not suitable for sheet steel production, in which the finished product must be continually examined as it is manufactured.

In a further Computer Tomography system disclosed by Hoffman et al., (U.S. Patent No. 4,951,222), which is hereby incorporated by reference for its teachings on tomography in the steel industry, a fan-shaped beam of radiation is generated and divided into fan ray elements. These fan ray elements are directed to a planar section of a structural steel object, such as an I-beam, and detected by a set of detectors. Each detector produces a signal representative of the intensity of the radiation of a detected fan ray element and selected coordinates defining a cross-sectional image of the object are determined from the intensity signals of the detectors. Because the source rotates about the object as it moves, the object is subject to a helical scan of its dimensions. Thus, areas of the object may not be examined.

SUMMARY OF THE INVENTION

A method and apparatus are disclosed for determining the dimensions of an object. A plurality of fan shaped beams of radiation are generated, wherein each fan shaped beam originates from a distinct physical location, and wherein each fan shaped beam is divided into a plurality of fan ray elements. Each fan shaped beam is directed towards respective ones of a plurality of detectors. The object is interposed between the plurality of fan shaped beams and the plurality of detectors. After several fan ray elements from each of the fan shaped beams are detected, a plurality of data signals corresponding to the detected fan ray elements are produced. The plurality of data signals are then processed to determine the dimensions of the object.

OVERVIEW

The present invention is embodied in a computer tomography system which measures the thickness and edge position of a variety of materials, such as hot-rolled steel. These parameters are measured by interposing the material (such as sheet steel) between two fan-beam radiation sources and a linear array of radiation detectors. Any radiation passing through the sheet steel is attenuated before it reaches the detectors. By correlating the position of each detector with the level of radiation received by each detector, the edge position of the sheet steel may be readily determined. Furthermore, the level of the signal produced by each detector in response to the illuminating radiation may be used to determine various parameters relating to the sheet steel thickness profile (for example crown, wedge, edge drop, ridge. etc.). The system includes facilities for performing beam hardening calibration, detector residue compensation and scatter correction.

Figure 1:
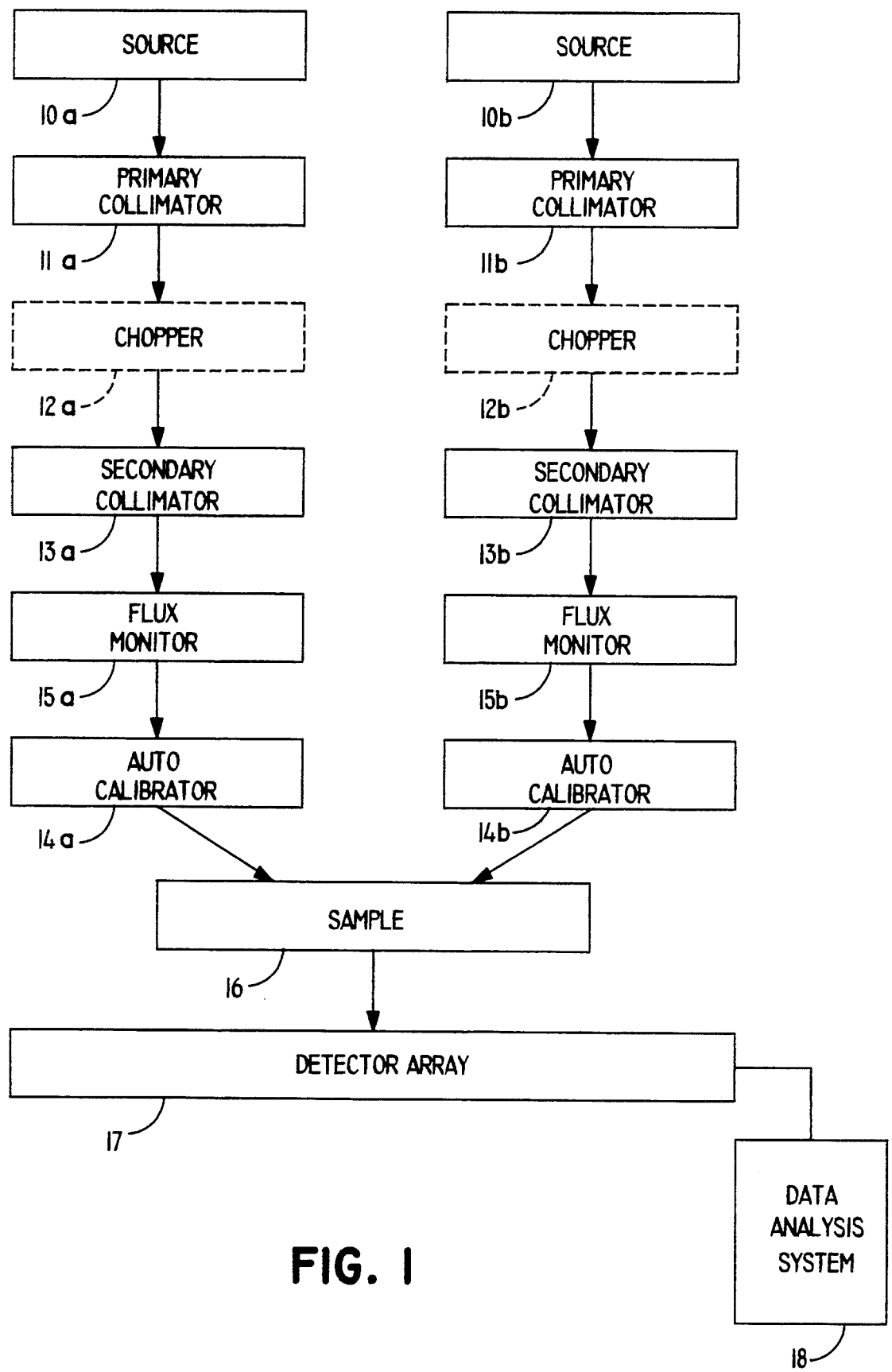
FIG. 1 shows, in functional block diagram form, an exemplary embodiment of a computer tomography system for measuring thickness and edge profile of a metal sample.

An exemplary embodiment of the present invention is shown in FIG. 1. X-rays produced by two X-ray sources 10a and 10b are used to illuminate the plurality of radiation detectors which constitute detector array 17. These detectors are used to measure the intensity variation of the X-rays being produced as a steel sample 16 passes out of the plane of the drawing down the roller line (not shown) through the X-ray beams. Information generated by the detector system about the sheet steel sample 16 is sent to and processed by a data analysis system in real time to provide an accurate estimate of the sheet thickness profile and other measurements.

Two primary collimators 11a and 11b are desirably attached to the beam ports of the tube heads of X-ray sources 10a and 10b, respectively. The primary collimators shape the X-ray beams and reduce stray radiation levels within the source enclosures of the X-ray machines.

In an exemplary embodiment of the present invention, steel sample 16 is illuminated by both X-ray sources simultaneously at respectively different locations. Hence, in the exemplary embodiment, a separate detector array is illuminated by each X-ray source. In a further exemplary embodiment of the present invention, both X-ray sources are directed towards the same location on steel sample 16 and a plurality of choppers 12a and 12b are employed to alternately block the radiation emanating from each X-ray source. Thus, alternate illumination of substantial portions of a single detector array by each X-ray source is realized. In the further exemplary embodiment, measurements made during each period of illumination enable the detector system to obtain information about the steel sheet from two different directions or views.

Secondary collimators 13a and 13b are each desirably located beneath each primary collimator. The secondary collimators provide final X-ray collimation within the source enclosure in which the X-ray machines are housed.

Two flux monitors 15a and 15b are desirably used to monitor radiation output from the respective X-ray sources 10a and 10b and to initiate data acquisition. Each flux monitor 15a and 15b is mounted in front of the beam port of a respective one of the X-ray sources and 10b directly underneath the secondary collimator.

Two auto-calibration assemblies 14a and 14b are desirably located beneath the respective flux monitors 15a and 15b. Each auto-calibration assembly includes a plurality of precisely measured metal samples. Each sample may be individually placed within the radiation beam. By individually placing each sample within the X-ray beam, the level of attenuation of the X-ray beam caused by each sample may be determined. As explained below, this information is used to precisely determine the dimensions of the manufactured sheet metal.

DETAILED DESCRIPTION

Figure 2:
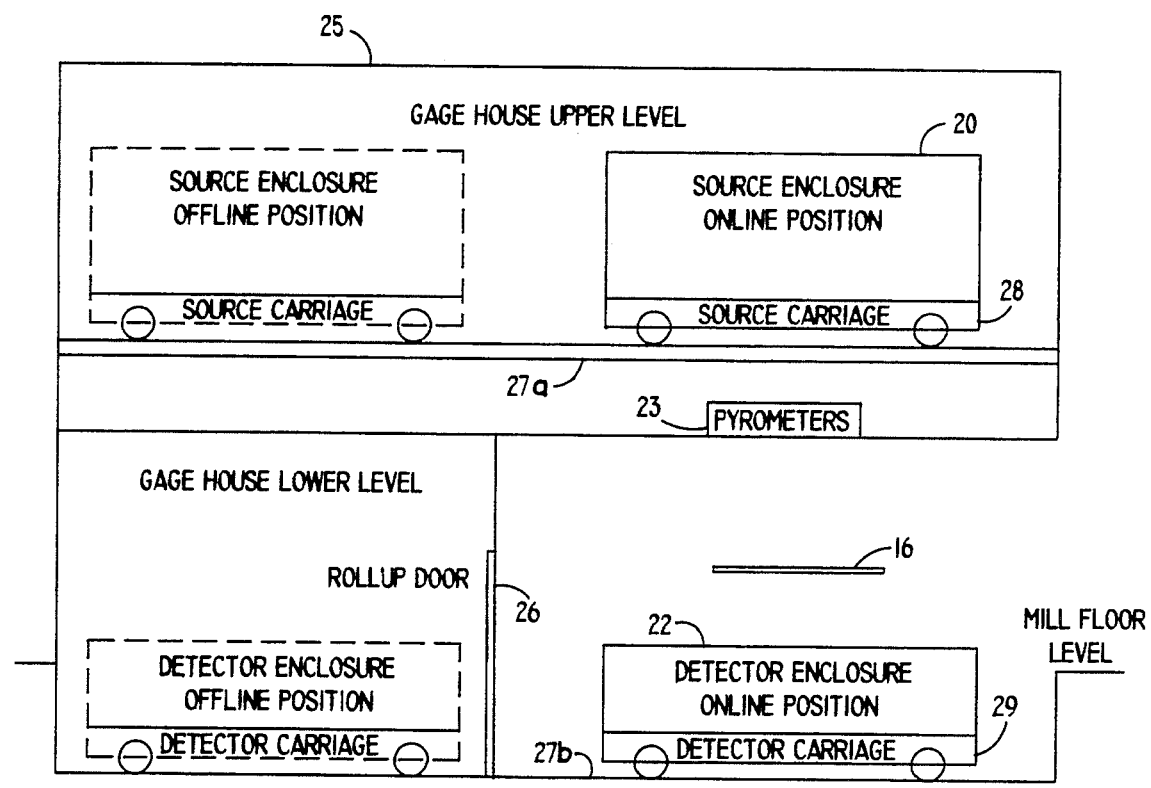
FIG. 2 is a block diagram which shows the source enclosure and the detector enclosure.

Referring now to FIG. 2, an exemplary embodiment of the present invention is shown in which a source enclosure 20 is shown above steel sample 16. Detector enclosure 22 is shown below steel sample 16.

Source enclosure 20 and detector enclosure 22 are desirably mounted on motorized carriages 28 and 29, respectively, that are used to move the enclosures between on-line and off-line (shown in phantom) positions. Tracks 27a and 27b are used to guide the motion of the carriages 28 and 29, respectively. The source enclosure/carriage is located in the upper level of gauge house 25 while the detector enclosure/carriage is located in the lower level of gauge house 25. In their off-line positions, both enclosures are within the confines of the gauge house. When in their on-line positions, the detector enclosure/carriage is located outside of the gauge house. As the detector enclosure/carriage moves between its on-line and off-line positions, it passes through a high-pressure water spray wash (not shown) and through a motorized roll-up doorway 26 in the lower level of the gauge house.

Figure 3:
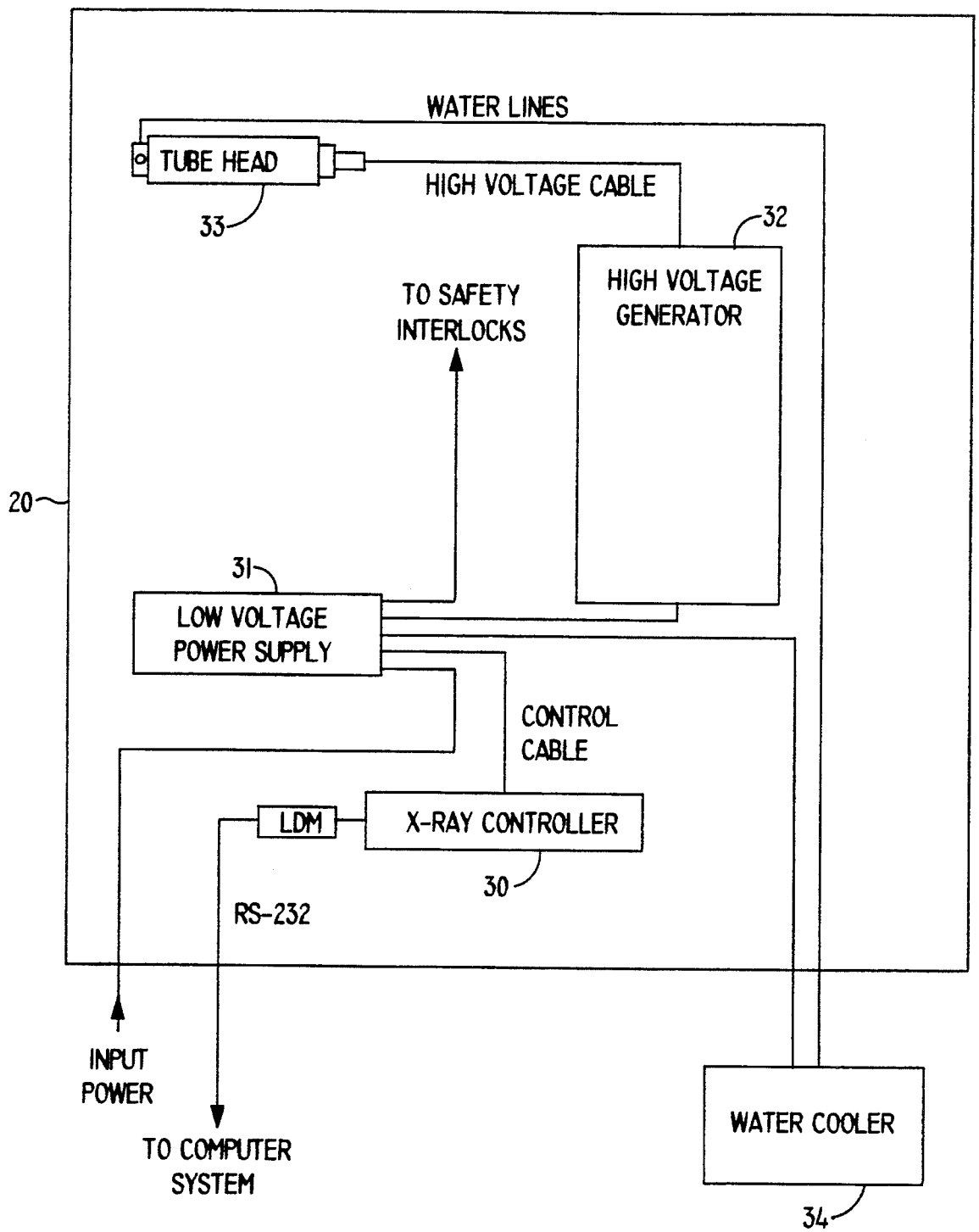
FIG. 3 is a block diagram which shows details of the source enclosure.

The exemplary source enclosure 20 includes two X-ray sources. One of these sources is shown FIG. 3. In an exemplary embodiment of the present invention, the X-ray source is a computer controlled Philips MG 225 X-ray machine. Each X-ray source consists of a control unit 30, low voltage power supply 31, high voltage generator 32, X-ray tube head 33, water cooler 34, and assorted interconnection cables.

Figures 4, 4A:
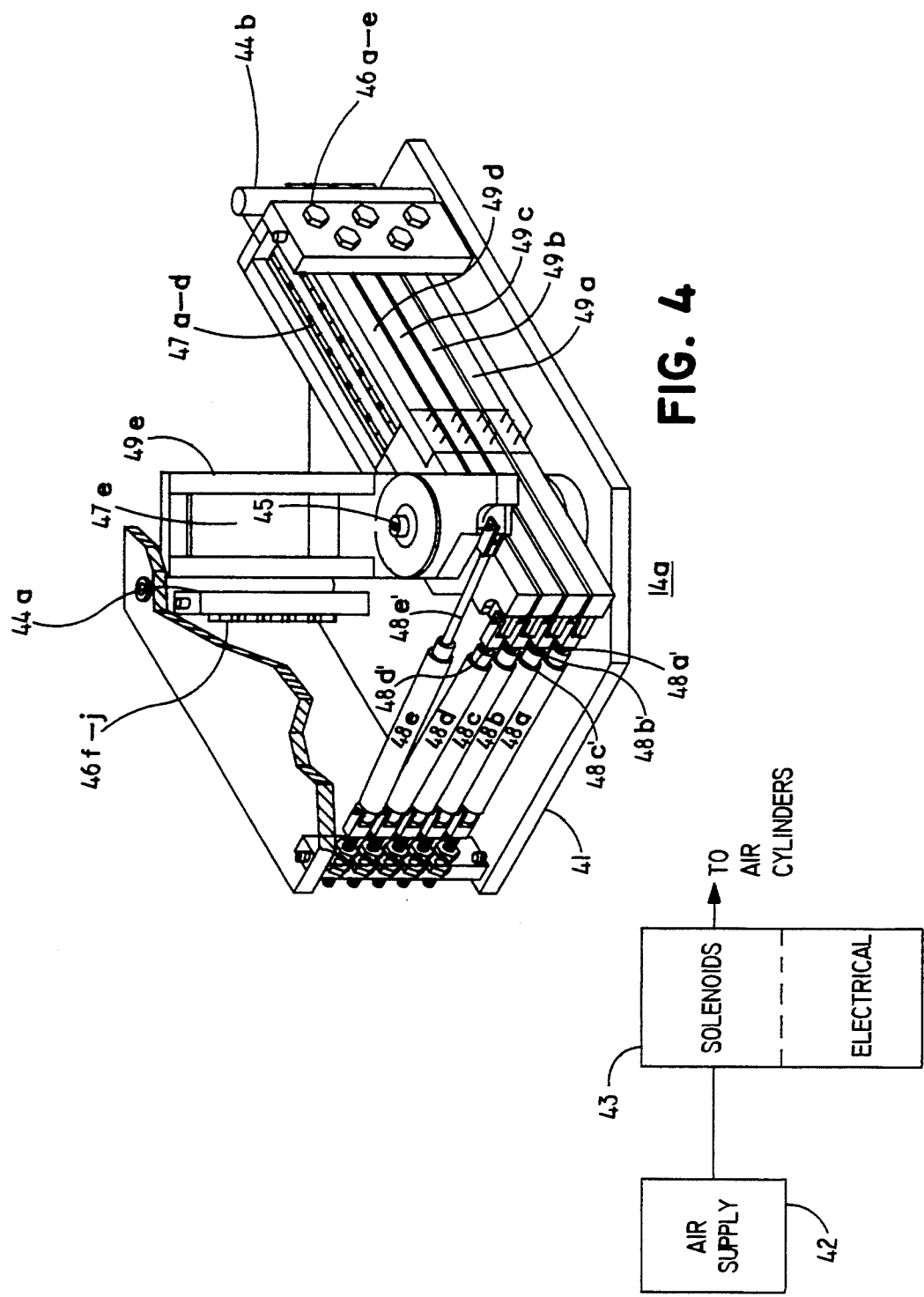
FIG. 4 is a perspective view of an auto-calibration unit.
FIG. 4a is a block diagram which shows circuitry and an air supply coupled to the auto calibration unit.

As shown in FIG. 1, two auto calibration subsystems 14a and 14b are provided, one for each X-ray source 10a and 10b. An exemplary embodiment of a auto calibration subsystem 14a is shown in FIG. 4. The auto calibration subsystems are used to perform routine calibrations and to selectively prevent x-rays from exiting the source enclosure 20. Each auto calibration subsystem 14a and 14b includes a auto calibration assembly 41, air supply 42, and associated control circuitry 43 shown in FIG. 4a. The auto calibration assemblies are each located beneath the respective secondary collimators and flux monitors.

Each exemplary auto calibration assembly is desirably constructed with five pneumatically actuated double-acting air cylinders 48a through 48e. Each air cylinder is connected to a respective pivoting magazine 49a through 49e that houses a calibration sample 47a through 47d or lead shutter 47e. Actuation of a first half of an air cylinder causes a respective magazine to swing out of the X-ray beam. Actuation of a second half of an air cylinder causes a respective magazine to swing into the X-ray beam. Other structures, including but not limited to pneumatic or electronic structures, may also be used in order to move each magazine in and out of the X-ray beam.

Control of the auto calibration assembly is via a computer controlled solenoid valve interfaced with control circuitry 42.

When the lead shutter 47e is completely out of the X-ray beam, the lead shutter is referred to as being open. When the lead shutter is completely in the X-ray beam, the lead shutter is referred to as being closed. Similarly, when a calibration sample is completely out of the X-ray beam calibration sample, the sample is referred to as being out. When a calibration sample 47a through 47d is completely in the X-ray beam, it is referred to as being in. Other than the times when the shutters and calibration samples are moving between their positions, the shutter and calibration samples are either in their completely open/out positions or in their completely closed/in positions.

Proximity switches 46a through 46e and 46f through 46j are provided to sense the position of each magazines. For purposes of safety, each magazine operates in conjunction with two proximity switches. The first switch (e.g. 46a) and the second switch (e.g. 46f) senses whether the magazine is in or out of the X-ray beam. If neither switch is activated, the magazine is assumed to be somewhere between the fully closed and fully open positions, thus indicating improper operation of the auto calibration assembly.

Each proximity switch is equipped with a red indicator light (not shown) that indicates when the switch is on.

Figure 5:
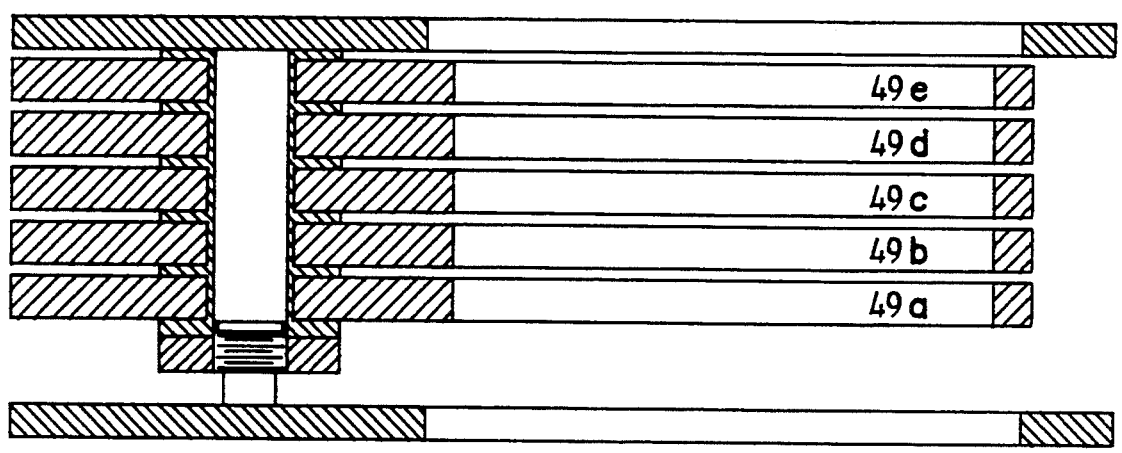
FIG. 5 is a cross-sectional view of the auto-calibration unit shown in FIG. 4.

A cross-sectional view of a auto calibration assembly is described with reference to FIG. 5. As set forth above, each auto calibration assembly has four steel calibration samples of different thickness 47a through 47d and a one-half inch thick lead shutter 47e, each housed in a respective magazine 49a through 49e. The lead shutter 47e is closest to the X-ray machine tube head 33, shown in FIG. 3. The remaining calibration samples are stacked under the shutter in order of increasing thickness.

In an exemplary embodiment of the present invention, the nominal thicknesses of the samples are shown in Table I:

TABLE 1

| Calibration Sample | Nominal Thickness (in inches) |
| --- | --- |
| 48d | 1/16 |
| 48c | 1/8 |
| 48b | 1/4 |
| 48a | 1/2 |

Desirably, each calibration sample is manufactured with a tolerance of 1/10,000 of an inch.

When the system is initially powered up, all of the sample magazines 49a through 49d are out and the lead shutter 49e is closed. Under normal operation, the magazines housing the calibration samples are free to move in and out as required. A safety system is also included for moving the lead shutter to the closed position in the event of an air pressure or electrical failure.

During normal gauge operation, the auto calibration mechanisms are cycled under computer control to obtain calibration data. This is described below with reference to FIG. 16.

In an exemplary embodiment of the present invention, sheet 16 is illuminated by both x-ray sources simultaneously. Each x-ray source illuminates a respectively different portion of sheet 16. In a further exemplary embodiment of the present invention, sheet 16 is illuminated by one x-ray source at a time. In addition, each x-ray source is directed towards a common area beneath sheet 16. Illumination by one X-ray source at a time is accomplished using a chopper subsystem.

Figure 6A:
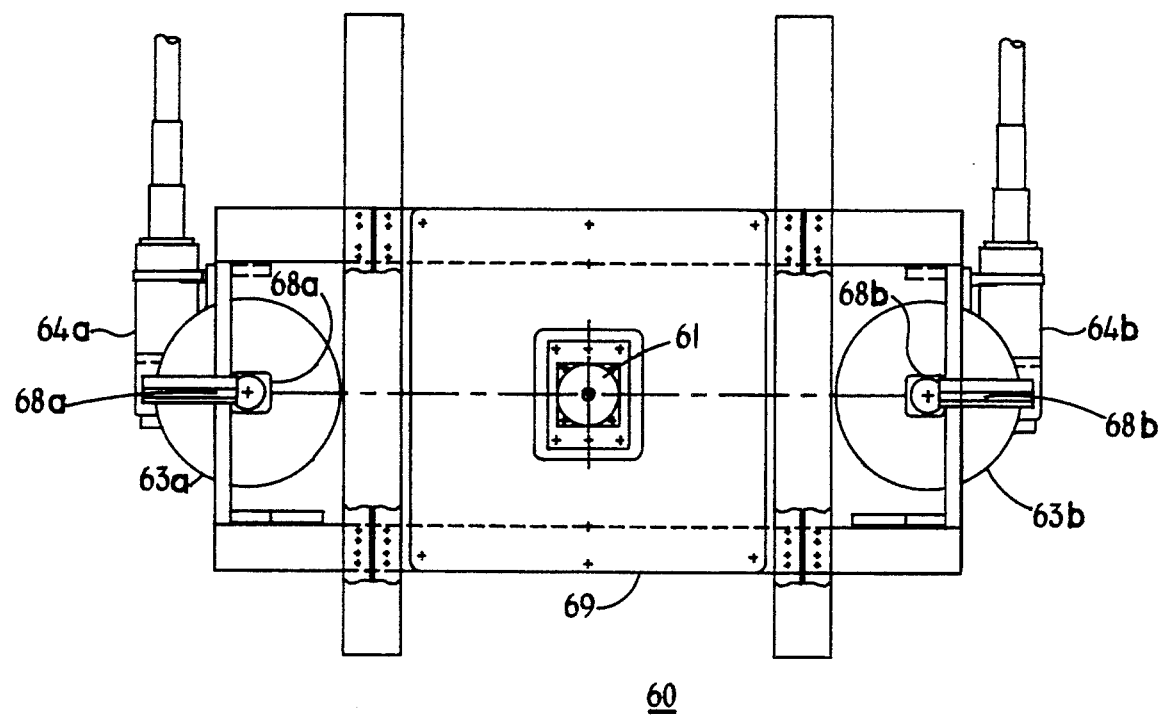
FIG. 6a is a bottom plan view drawing and FIG. 6b is an elevation drawing of the chopper subsystem shown in FIG. 1.
Figure 6B:
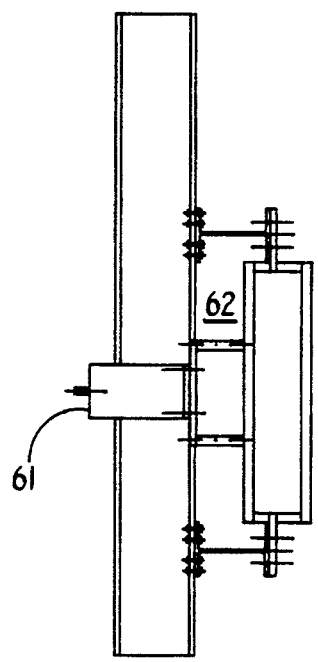
Figure 6C:
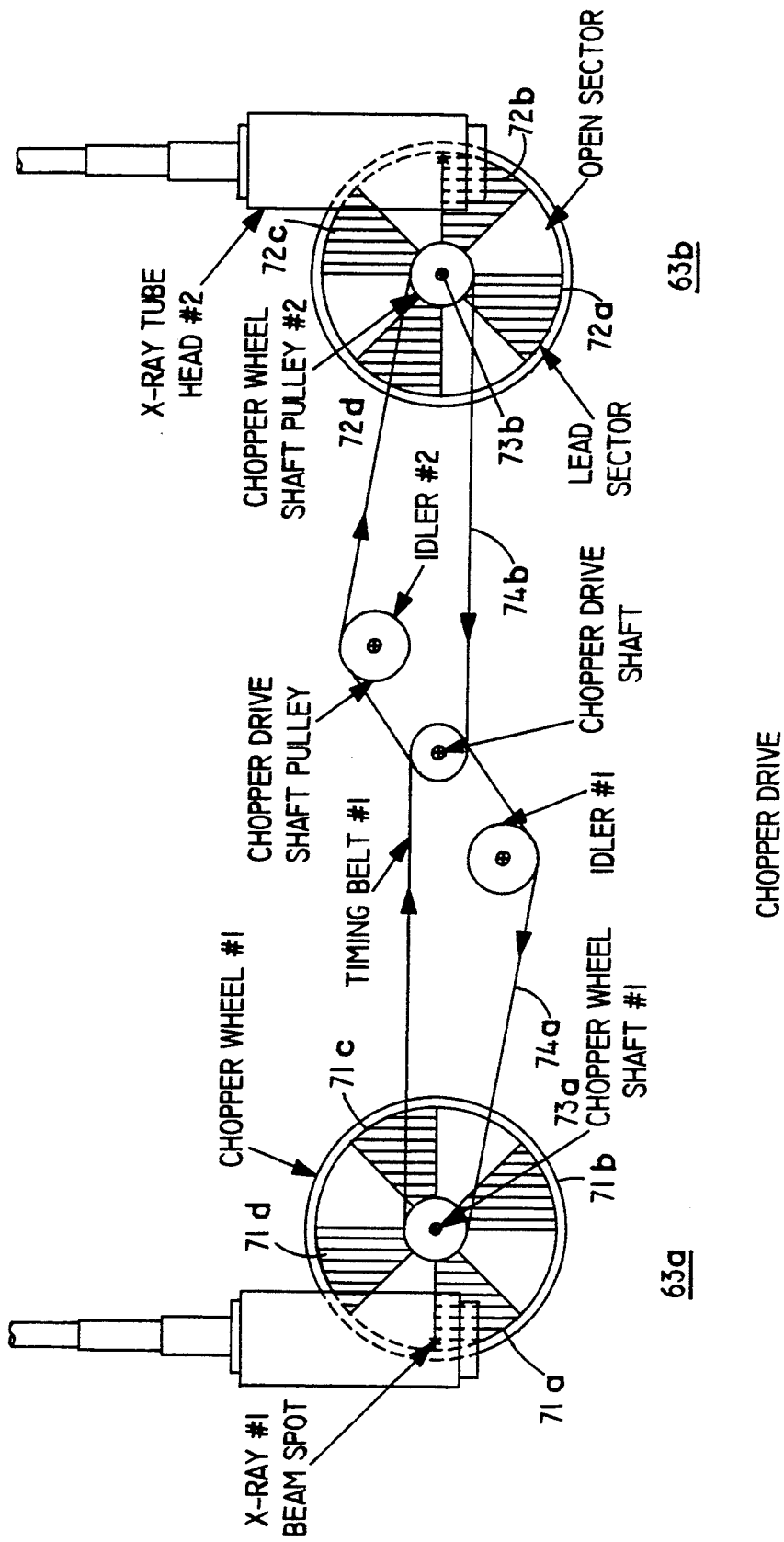
FIG. 6c is a top plan view of the chopper subsystem shown in FIGS. 6a and 6b.

The chopper subsystem assembly 60 is shown with reference to FIGS. 6A, 6B and 6C. The chopper subsystem support assembly 69 is used to support the chopper motor 61, mechanical drive 62, and chopper wheel assemblies 63a and 63b. It is also used to support the X-ray machine tube heads 64a and 64b and the secondary collimators 68a,b. The mechanical drive 62 is powered by the chopper motor 61 and is used to rotate the two chopper wheel assemblies 63a and 63b. In an exemplary embodiment of the present invention, the X-ray machine chopper wheel assembly is rotated at a speed of approximately 1500 revolutions per minute (RPM). Rotary motion from the chopper motor is used to spin two timing belt drive pulleys that are attached to the chopper drive shaft 73a,b of the chopper drive wheels 63a and 63b, respectively. Each chopper drive shaft is supported by bearing assemblies (not shown).

An optical rotary encoder 68a and 68b (shown in FIG. 6a) is attached to the shaft of each chopper wheel. These rotary encoders are used to monitor the speed of the chopper wheels and to indicate the periods of time when data acquisition should occur. In a preferred embodiment of the present invention, the rotary encoder produces 400 pulses per revolution.

As shown in FIG. 6C, each chopper wheel 63a and 63b is a balanced assembly containing four sectors 71a through 71d and 72a through 72d. Each sector can be comprised of a variety of materials such as lead, tungsten, depleted uranium, etc. The lead sectors may be fabricated from lead-babbitt alloy 13. The lead sectors are attached to the chopper wheel by inner and outer ring clamps. A chopper hub (not shown) attaches each chopper wheel to its respective chopper wheel shaft 73a and 73b via 4 shoulder screws (not shown).

The arrows on the timing belts 74a and 74b shown in FIG. 6C indicate the desirable direction of motion. The X-ray beam from each X-ray source may be separately blocked by one of the lead sectors in its respective chopper wheel. As the chopper wheels rotate, the X-ray beam from X-ray source 64b will become unblocked as the open sector between lead sectors 72b and 72c rotates in front of it. Similarly, the beam from X-ray source 64a will become blocked as the lead sector 71a rotates in front of it.

Figure 7:
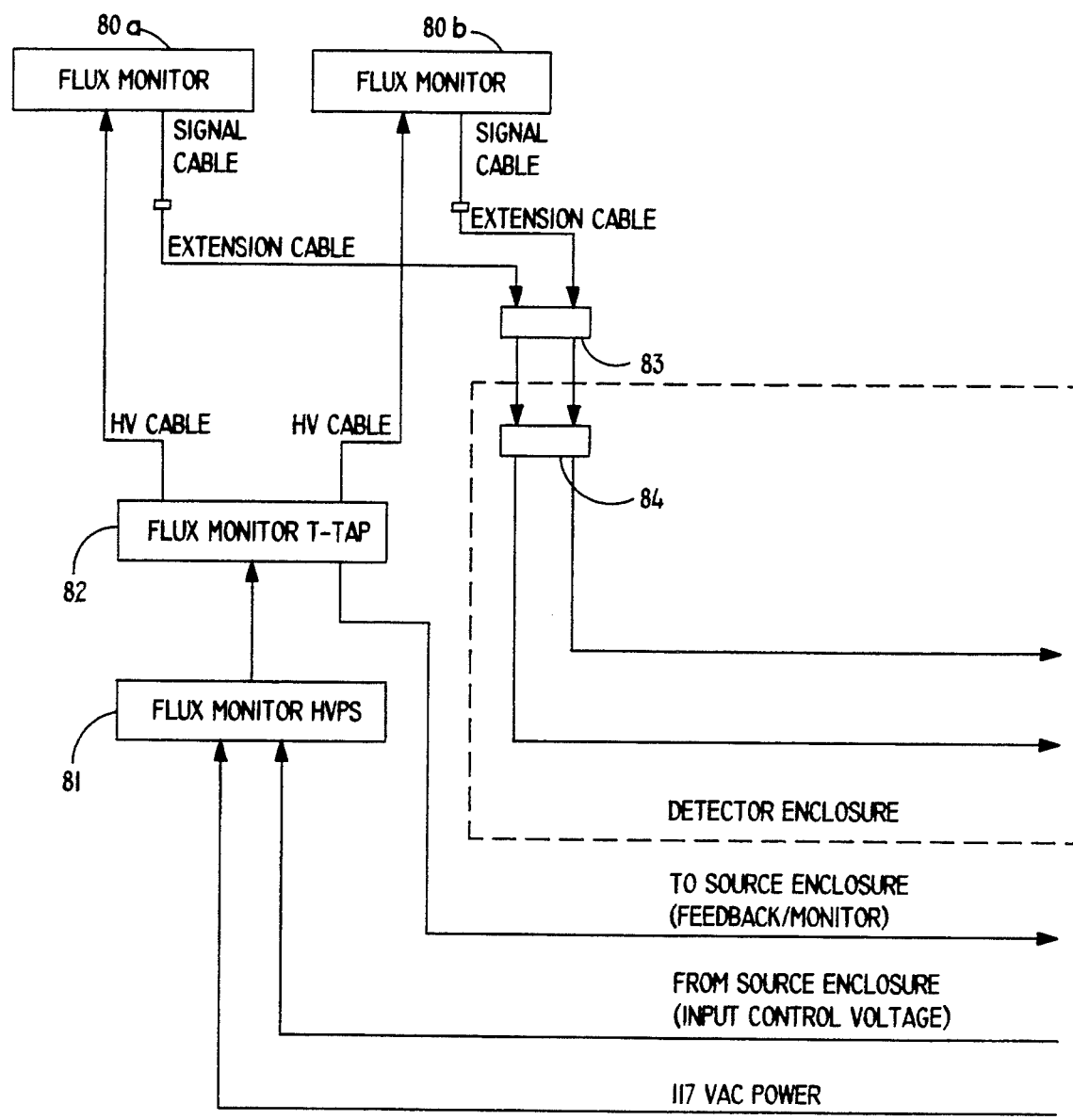
FIG. 7 is a block diagram which shows the flux monitor subsystem.

The flux monitor subsystem is shown with reference to FIG. 7. The flux monitor subsystem consists of two flux monitors 80a and 80b, flux monitor high voltage power supply (HVPS) 81, flux monitor T-Tap 82 source enclosure flux monitor signal cable bulkhead connector 83 and detector enclosure flux monitor signal cable bulkhead connector 84. Flux Monitor High Voltage Power Supply (HVPS) 81 provides high voltage to Flux Monitor T-tap 82. Flux monitor T-tap 82 directs this power to Flux Monitor 80a and Flux monitor 80b. Source enclosure flux monitor signal cable bulkhead 83 and detector enclosure flux monitor signal cable bulkhead connector 84 secures signal cables, emanating from the flux monitors, to the source enclosure and detector enclosure, respectively.

Figure 8:
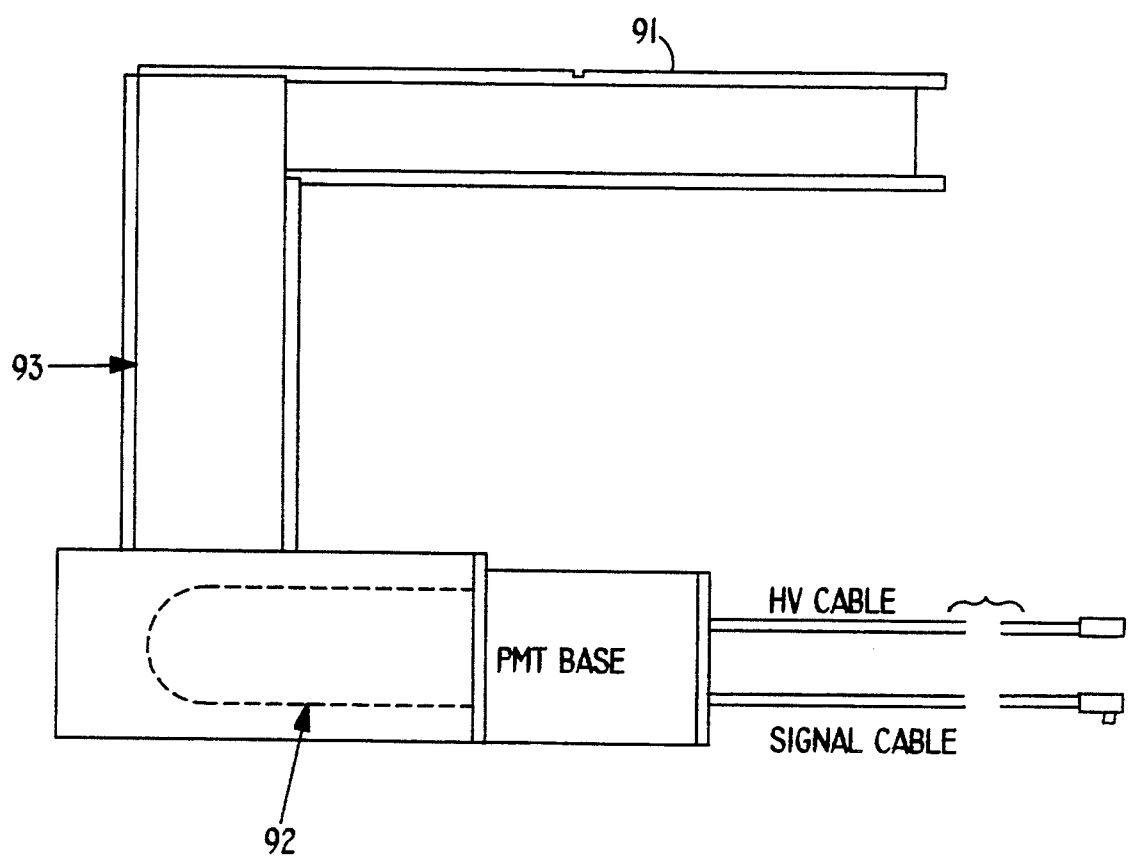
FIG. 8 is a plan view drawing of the flux monitor detector package.

Each flux monitor is used to determine the intensity of the X-rays provided by its respective source. In addition, each flux monitor may be used to initiate data acquisition. An exemplary flux monitor shown with reference to FIG. 8. Each flux monitor 80a and 80b consists of an organic scintillator 91 that is coupled to a photomultiplier tube 92 via an acrylic light pipe 93. The scintillator-light pipe assembly is housed within a light-tight package that is attached to a photomultiplier tube housing.

In the further exemplary embodiment of the present invention, when the X-ray beam from the source is blocked by a lead segment of a chopper wheel, the flux monitor output signal is low. The flux monitor signal is not zero because of background noise. As the edge of the lead from the chopper wheel moves away from the source, the flux monitor signal ramps up. Eventually when there is no lead in front of the beam, the flux monitor signal reaches its full amplitude. This amplitude remains at a full level until the leading edge of the next segment of lead from the chopper wheel reaches the source. The signal then begins to fall. When the lead again fully blocks the source, the signal resides at its lowest level.

The flux monitors are used in combination with the rotary encoders to synchronize data acquisition. As described previously, a chopper wheel under each X-ray source ensures that only one X-ray source illuminates the detector array at a time. In addition, as described previously, the chopper wheels ensure that the X-ray sources alternate in their illumination of the detectors.

As the chopper wheels rotate and the lead components of the chopper wheels move away from the X-ray sources, the intensity of the radiation illuminating the detectors gradually increases. When the lead components have completely moved away from the X-ray sources, the X-ray sources illuminate the detectors with full illumination. Thus, if data acquisition begins before the lead components have completely moved away, it may occur during only partial illumination. In this instance, incorrect results would be obtained.

Figure 9:
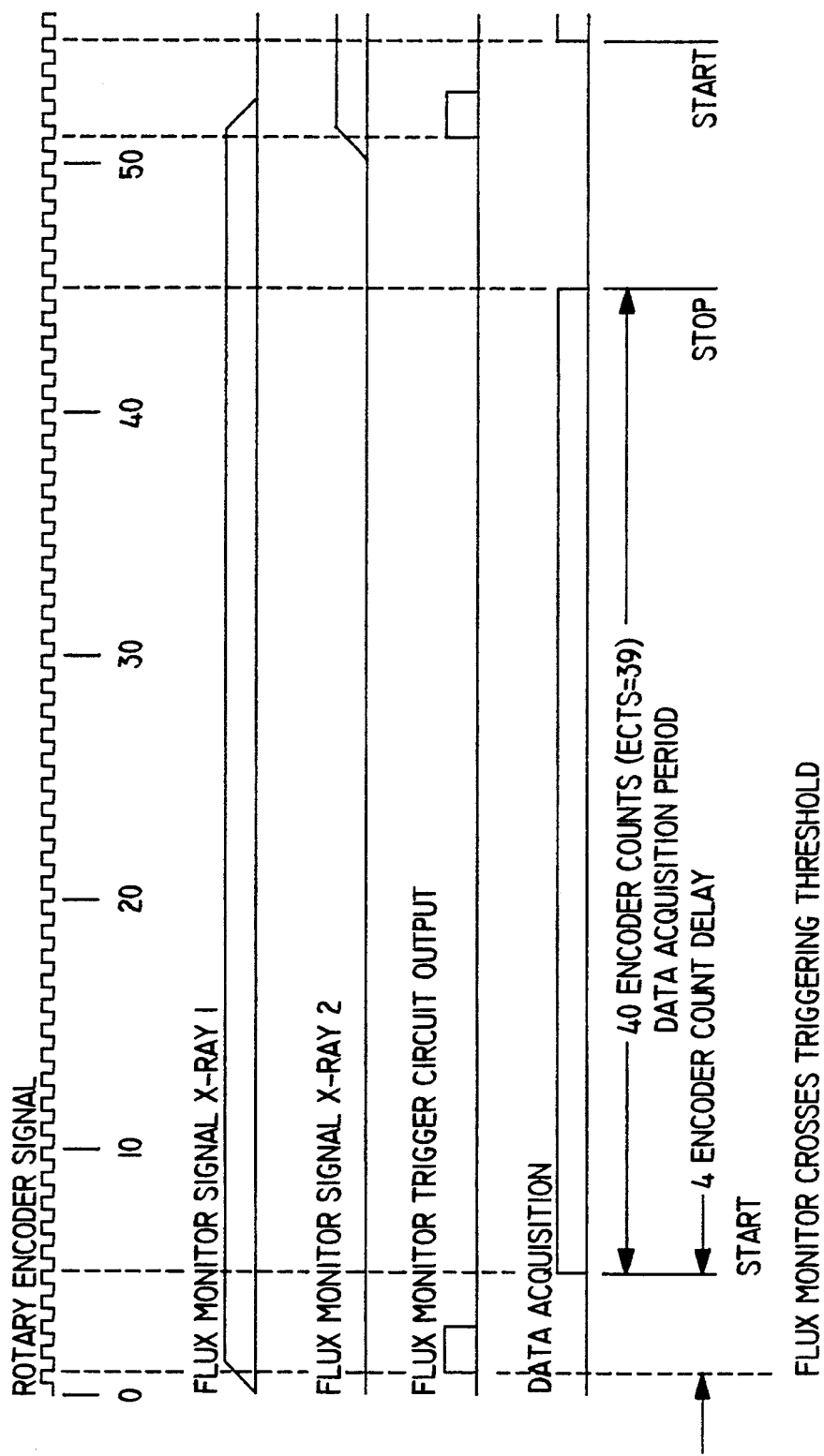
FIG. 9 is a timing diagram which is useful for describing the data acquisition timing sequence.

The flux monitors and rotary encoders ensure that data acquisition does not begin until the detectors are fully illuminated. As shown in FIG. 9, as a lead element in the chopper wheel corresponding to the first X-ray source moves out of the beam produced by its source, the flux monitor signal corresponding to the source gradually increases. When this flux monitor signal reaches a predetermined intensity, the counting of a predetermined number of rotary encoder signal pulses (e.g. 4) begins. When the predetermined number of rotary encoder signal pulses has been counted, data acquisition begins. Data acquisition continues for a further predetermined number of rotary encoder signal pulses (e.g. 40). When the further predetermined number of rotary encoder signal pulses has been counted, data acquisition ceases. As a lead element in the chopper wheel corresponding to the other X-ray source moves out of its beam, the flux monitor signal corresponding to the second X-ray source gradually increases. Data acquisition then continues in accordance with the sequence of events described above relating to the first X-ray source. This process of synchronizing data acquisition with the irradiation from each X-ray source continues until the X-ray sources are turned off or the flux monitors are turned off. Thus, the synchronization process continues independently of whether the shutter is closed or open.

Figure 10A:
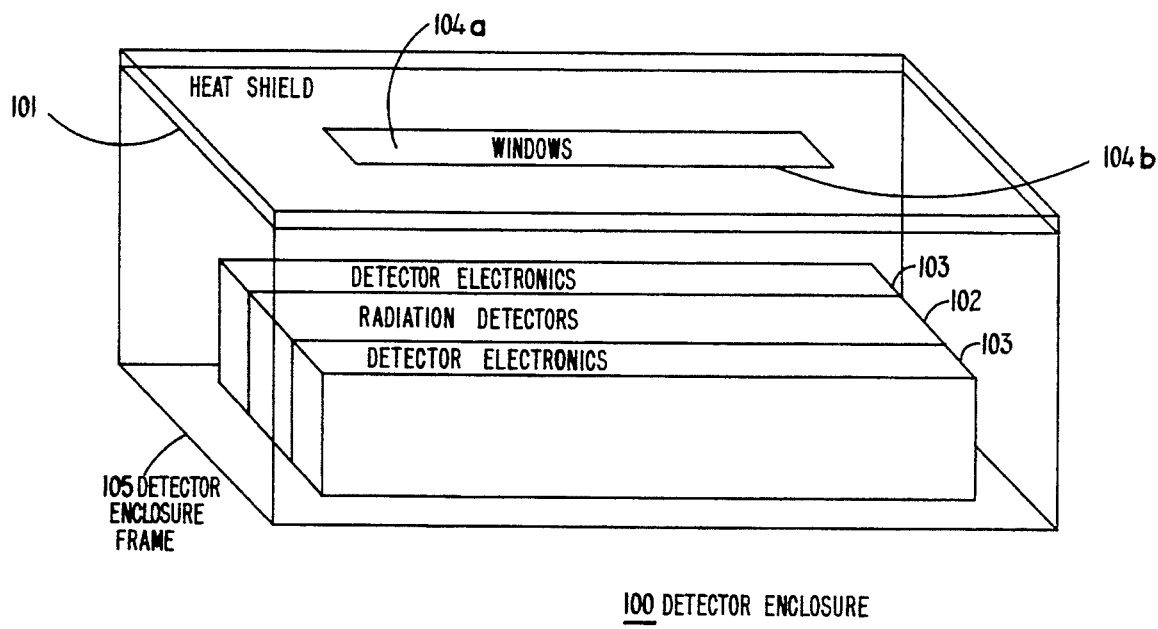
FIG. 10a is a perspective view of the detector enclosure.

The detectors are housed in one or more exemplary detector enclosures (depending on the particular embodiment of the present invention) which is shown in FIG. 10a. In the exemplary embodiment of the present invention a plurality of detectors are grouped into detector banks. Each detector bank is positioned beneath a respective x-ray source. The detector banks may each be housed in a separate detector enclosure, or alternatively, the detector banks may be housed together in a single detector enclosure. In the further exemplary embodiment of the present invention, the plurality of detectors are grouped into a single detector bank. At least a portion of the single detector bank is illuminated by each x-ray source.

The exemplary detector enclosure 100 shown in FIG. 10a includes the detector enclosure frame 105, six removable side covers (not shown), heat shield 101, a plurality (e.g. 413) of radiation detectors 102, detector electronics 103, and an environmental heating, ventilation and air conditioning subsystem (not shown). The detectors are desirably mounted on precision detector guide plate assemblies (not shown) within the detector enclosure.

The heat shield 101 rests on top of the detector frame 100. The heat shield 101 is an air and water tight weldment preferably fabricated from 0.25 inch thick 316 stainless steel plates. The heat shield 101 is used to thermally insulate the detector enclosure from the heat of the steel sheet being fabricated in the mill.

Two windows 104a and 104b made from aluminum, stainless steel or a titanium alloy (Ti-6A1-4V, for example) located on the top and bottom surfaces of the heat shield 101 provide a low attenuation path for the x-rays to reach the detectors inside the detector enclosure. A central window cavity is located between the titanium windows and is air-cooled to prevent excessive heat buildup within this cavity. In addition, a plurality of cavities are included for water cooling the detector enclosure.

In an exemplary embodiment of the present invention, the detector electronics 103 consists of 416 electronic detector channels to accommodate 413 detectors, 2 flux monitors, and a time channel. However, the total number of detectors (and hence the total number of electronic detector channels) varies depending upon the particular application. These electronic detector channels are interfaced to the data analysis system 18, shown in FIG. 1. The flux monitors are designed as described above. The detectors are designed as described below. The time channel transmits a periodic pulse and may, for example, be used for providing a timing pulse when the rotary encoders are not being used. Thus, the periodic pulse which is provided by the time channel may be used, for example, in the further exemplary embodiment of the present invention in which choppers are not used. In an exemplary embodiment of the present invention, the time channel may comprise a resonant crystal oscillator. The detector electronics also includes data acquisition circuitry that accepts data acquisition start signals from the flux monitors and the rotary encoder and the data acquisition stop signals from the rotary encoder.

Each of the detector packages is light-tight and contains a scintillator (i.e. a rectangular scintillation crystal) optically coupled to an acrylic light pipe. The scintillation crystal is chosen depending upon the specific application. Exemplary scintillation materials include Bismuth Germanate (BGeO) or cadmium tungstate (CdWO$_4$). An exemplary detector package is described in U.S. Pat. No. 4,437,006, entitled Method And Apparatus For Measuring Radiation In Computer-Assisted Tomography And Radiographic Applications, which is incorporated herein by reference for its teachings in the areas of computer tomography and radiation intensity measurement.

Figure 10B:
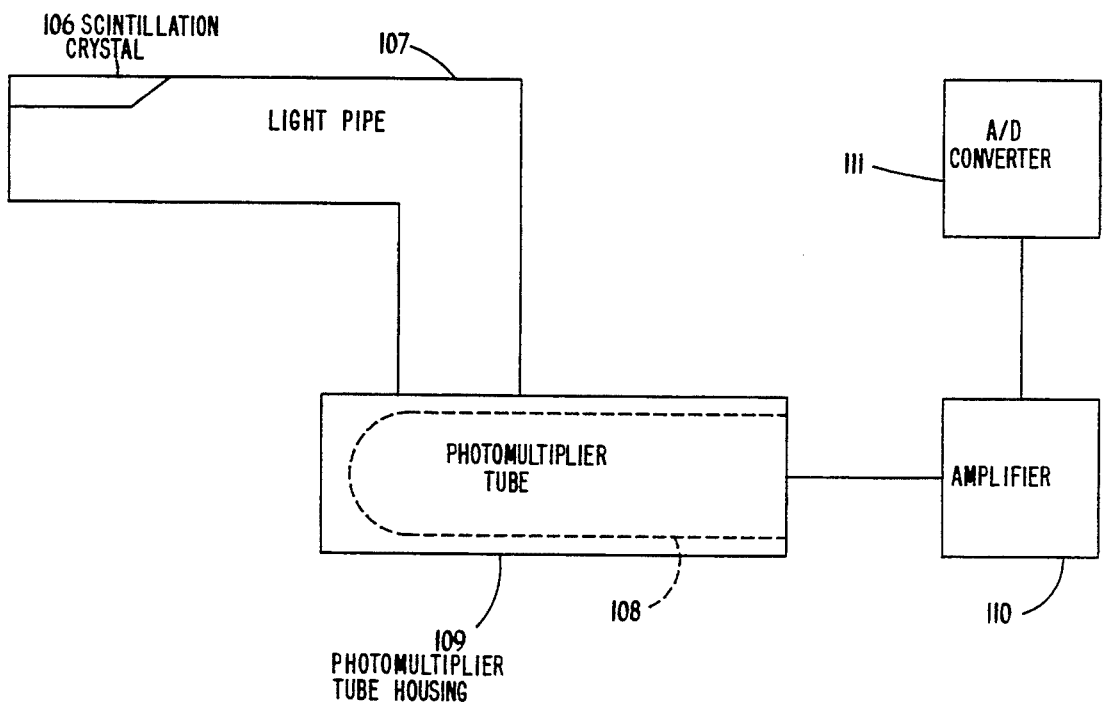
FIG. 10b is a block diagram of detector components and associated electronics.

As shown in FIG. 10b, scintillation crystal 106 is coupled to light pipe 107. Light pipe 107, in turn, is coupled to photomultiplier tube 108 which is positioned within photomultiplier tube housing 109. The signal output of photomultiplier tube 108 is coupled to amplifier 110 which in turn is coupled to A/D converter 111.

For a specific voltage applied, a detector with a high output sensitivity is able to indicate a larger range of thicknesses than a detector with low output sensitivity. This is because, in contrast with a low output sensitivity detector, a larger amount of steel can be placed between the high output sensitivity detector and the X-ray source while still obtaining a usable signal. Furthermore, a detector with relatively low gain or low output sensitivity can be increased to the sensitivity of a higher gain detector by increasing the voltage used to power the detector.

In theory, each detector's output sensitivity can be equalized by applying a different high voltage to each corresponding photomultiplier tube. This, however, would require a separate high voltage supply for each photomultiplier tube, resulting in a very expensive and complicated design. Thus, a small number of high voltage supplies is desirable. In order to reduce the number of high voltage supplies, the detectors in an exemplary embodiment of the invention are grouped by sensitivity or by gain so that one high voltage power supply can be coupled to each group of detectors. In a preferred embodiment of the present invention, the detectors are sorted into four groups, with each of the four groups powered by a slightly different high voltage supply in order to equalize the sensitivity of the groups. In this manner, the average output of each group of detectors is approximately equal. Computer-controlled-gain amplifiers are also used to adjust the output of each detector. Thus, the output of each detector within a group can De adjusted to be approximately the same. In this manner, all of the detectors in each group may be powered by the same high voltage power supply.

As previously stated, the sensitivity of a detector can be increased by increasing the voltage used to power the detector. Thus, low sensitivity detectors are powered by higher voltage supplies and high sensitivity detectors are powered by lower voltage supplies.

Each detector generates a current that is proportional to the amount of ionizing radiation (X-rays) impinging upon the scintillation crystal. This current signal is converted to a voltage in the amplifier and is sent to an A/D converter where it is converted to a digital signal. This digital signal is processed to determine various parameters relating to the steel sample being analyzed.

Figure 12A:
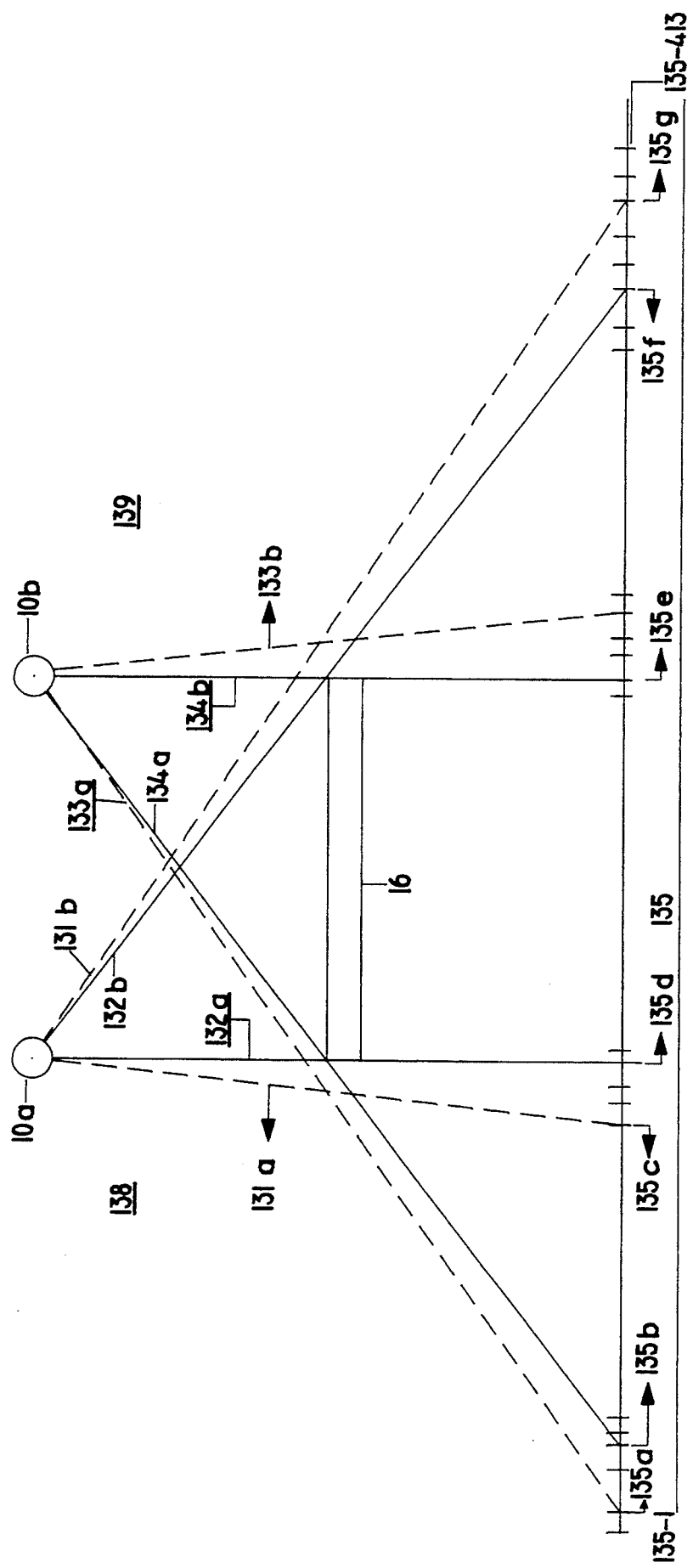
FIG. 12a is a cross-sectional drawing of a portion of the system shown in FIG. 1 which illustrates the orientation of the detectors relative to a measured metal sample.

The on-line tomographic gauge may be used for edge detection. Edge detection may be accomplished using the system configuration as shown in FIG. 12a. X-ray source 10a is located at the top left-hand corner of the figure. X-ray source 10b is located at the top right-hand corner of the figure. Each X-ray source produces a fan beam which more than completely encompasses the sheet to be measured. Each fan beam additionally encompasses any possible position that the sheet may occupy due to sheet transverse motion or sheet lifting. In an exemplary embodiment of the present invention each X-ray source resides above the chopper. The chopper motion causes the X-ray sources to alternatively illuminate the sample. Thus while X-ray source 10a is illuminating sample 16, X-ray source 10b is not. Similarly, while X-ray source 10b is illuminating sample 16, X-ray source 10a is not. In a further exemplary embodiment of the present invention, no choppers are used, and sample 16 is illuminated by both X-ray sources simultaneously at respectively different locations.

Figure 11A:
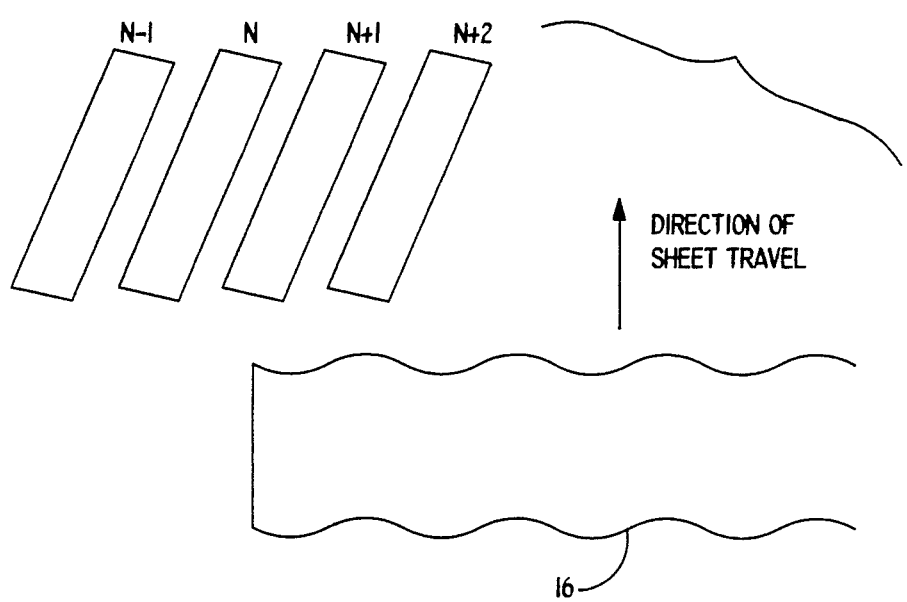
FIGS. 11a through 11c are diagrams which illustrate a method of determining the edge profile of an object using the apparatus disclosed in FIG. 1.
Figure 11B:
Figure 11C:

All of the detectors are arranged parallel to the expected plane of the manufactured sheet. In an exemplary embodiment of the present invention, the detectors are arranged in a continuous array. In a further exemplary embodiment of the invention, the detectors are skewed 18 degrees relative to the direction of sheet travel. This is shown in FIG. 11a. If the detectors were not skewed, i.e., if they were arranged in parallel to the direction of sheet travel, then the response of these detectors as they are traversed by the edge of the sheet would be non-uniform and there would be significant dips, or lessening of the response, at the interface between adjacent detectors. This is shown with reference to FIG. 11b. By contrast, by skewing the detectors, a signal is produced which has a more uniform response as a function of sheet edge position across the detector array. This is shown with reference to FIG. 11c. Thus, though the response is not perfectly flat, the response is sufficiently flat so that the signal can be analyzed to determine, to a high degree of accuracy, where an edge is located using the signals from adjacent detectors.

The advantage of skewing the detectors is illustrated by FIG. 11a, in which a plurality of detectors (N−1, N, N+1, N+2, etc.) are shown skewed to the direction of sheet travel and parallel to each other. Furthermore, a steel sheet is shown about to pass over the plurality of detectors. Detector N+2, and subsequent detectors to the right of detector N+2, clearly detect radiation which has been attenuated by the sheet. By contrast, a first fractional portion of detector N+1 detects full, unattenuated radiation while a second fractional portion of detector N+1 detects attenuated radiation. Finally, the majority of detector N detects full unattenuated radiation as only a small portion of detector N is covered by the sheet. Thus, only a small portion of detector N detects the presence of the sheet. Because the sheet does not cover any portion of detector N−1, all of the radiation reaching detector N+1 is unattenuated.

Thus, the edge of the sheet is positioned somewhere over the interface of the overlap between detector N and detector N+1. By determining the relative amounts of radiation received by detectors N and N+1 with respect to the radiation received by detector N+2, it is possible to determine the actual position of the edge of the sheet as it travels over the detectors to a high degree of accuracy.

Figure 11D:
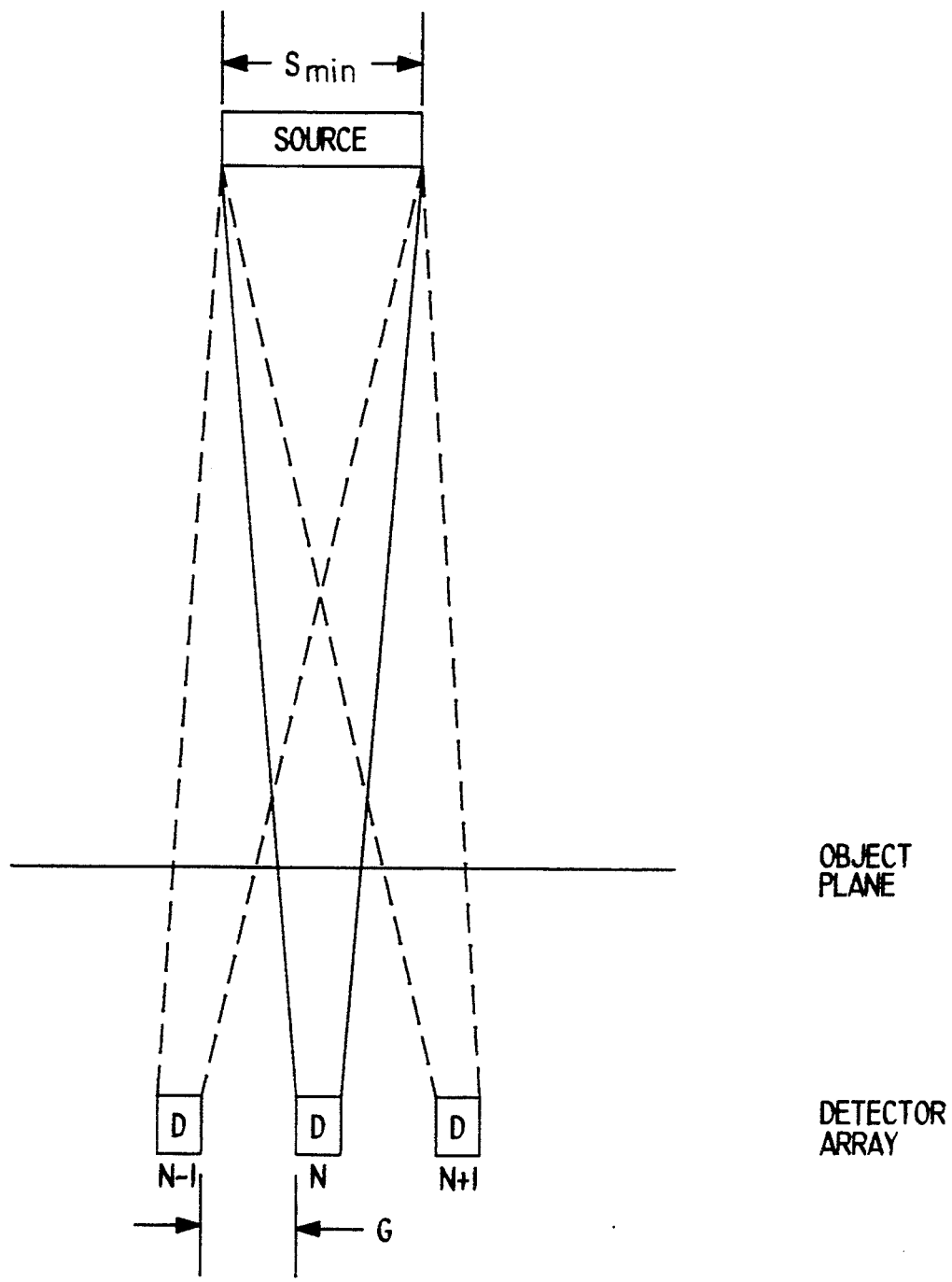
FIG. 11d illustrates an exemplary embodiment of the present invention in which an extended source is used

An alternative embodiment of the present invention includes the use of extended sources with detectors which need not be skewed. This is illustrated by FIG. 11d. In this alternative embodiment, changes in object position may be readily determined as a result of changes in detector response. If the size of the region from which the rays are emitted is sufficiently large that, at the plane of the object, the bundle of rays that are received in detector N overlap sufficiently with the bundles received in detectors N−1 and N+1, then the edge position may be readily determined. The minimum source dimension S (in the direction of the linear detector array), required for this method is the size in that direction of the gap G between active detector elements D, multiplied by the ratio of the distances $D_s$ and $D_d$ from the object plane to the source and detector array, respectively. That is, $S > G(D_s/D_d)$. The optimal value for S, for a given detector configuration and object-plane position, will depend on the details of the shape of the active regions of the source and detectors, but will usually be less than twice the minimum value.

An extended radiation source may be implemented in several ways. Radioisotope sources may be easily be shaped into elongated forms. Furthermore, X-ray beams can be extended by defocussing, by high-frequency magnetic or electrostatic modulation, or by use of multiple beams in close proximity.

The on-line tomographic gauge may be used to determine various dimensions relating to various materials such as manufactured metal (e.g. sheet metal). The thickness of the sheet passing the detectors may be determined by using the basic radiation absorption equation (1):

$$I_m = I_a e^{\mu t} \tag{1}$$

where $I_m$ is the measured intensity of the radiation beam after passing through the sheet, $I_a$ is the radiation intensity of the radiation beam in air, $\mu$ is the mass absorption coefficient which is material-specific, and t is the line length traversed by the radiation as it penetrates the metal. By simple algebraic manipulation, this equation can be converted into the form (2):

$$\ln(I_m/I_a) = -\mu t \tag{2}$$

Thus, if the radiation penetrates the metal normal to the top surface of the sheet surface, then the line length would be the actual thickness of the metal. However, because the radiation often penetrates the metal at an angle, t is actually typically larger than the thickness of the sheet. In order to determine the true thickness of the sheet, the angle of each X-ray beam striking each detector from each X-ray source is initially measured prior to activation of the X-ray machine. Thus, the angle of each on-coming X-ray beam to the scintillation detector is known. Since this angle is known, using simple trigonometry in conjunction with the line length t determined from equation 2, and also using the orientation of the sheet, it is possible to determine the actual thickness of the metal.

Furthermore, because $-\mu t$ is a function of the ratio between $I_m$ and $I_a$, and both $I_m$ and $I_a$ vary proportionally depending on the sensitivity of the detectors, t at a specific point on the sheet for a specific sheet orientation will always be determined to be the same regardless of detector sensitivity.

Referring to FIG. 12a, an exemplary embodiment of the present invention is shown in which a first radiation beam originating from X-ray source 10a illuminates steel sample 16. X-ray source 10b is also shown illuminating steel sample 16, although it is understood that both X-ray sources do not simultaneously illuminate a single area of steel sample 16. Both X-ray sources are shown simultaneously illuminating a single area of steel sample 16 merely for explanatory purposes.

X-ray source 10a is shown illuminating steel sample 16 with fan beam 138 extending between fan ray element 131a and fan ray element 131b. Fan ray elements 132a and 132b are located between fan ray elements 131a and 131b. Fan ray elements 132a and 132b are shown intersecting, respectively, the left and right edges of steel sample 16. The remaining fan ray elements originating from X-ray source 10a are not shown.

X-ray source 10b is shown illuminating steel sample 16 with fan beam 139 extending between fan ray element 133a and fan ray 133b. Fan ray elements 134a and 134b are located between fan ray elements 133a and 133b. Fan ray elements 134a and 134b are shown intersecting, respectively, the left and right edges of steel sample 16. The remaining fan ray elements originating from X-ray source 10b are not shown.

Thus, the edges of steel sample 16 are located at the intersection of fan ray elements 134a and 132a and at the intersection of fan ray elements 134b and 132b.

Figure 12B:
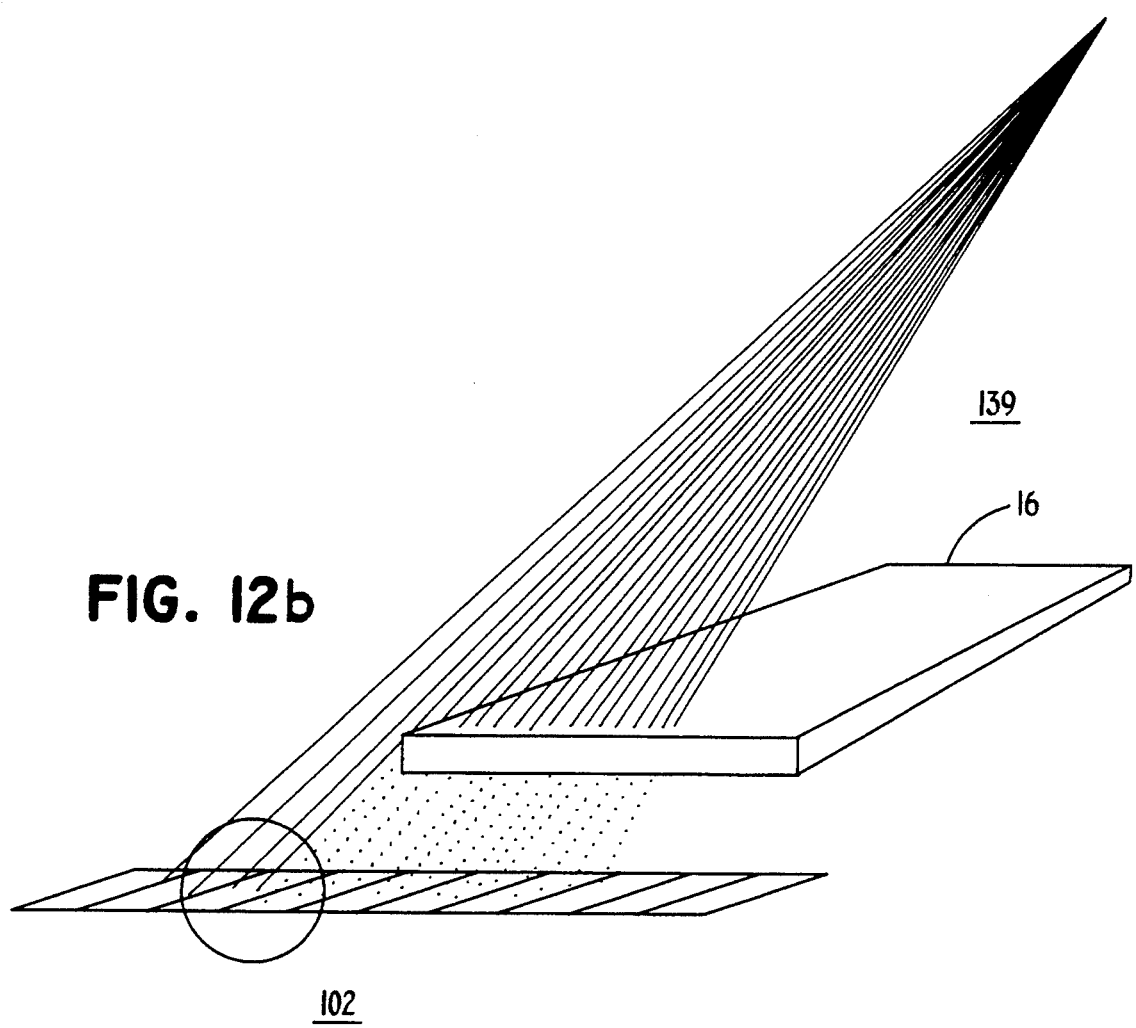
FIG. 12b is a perspective drawing which shows an exemplary position of a metal sample relative to an X-ray source and a plurality of detector elements.
Figure 12C:
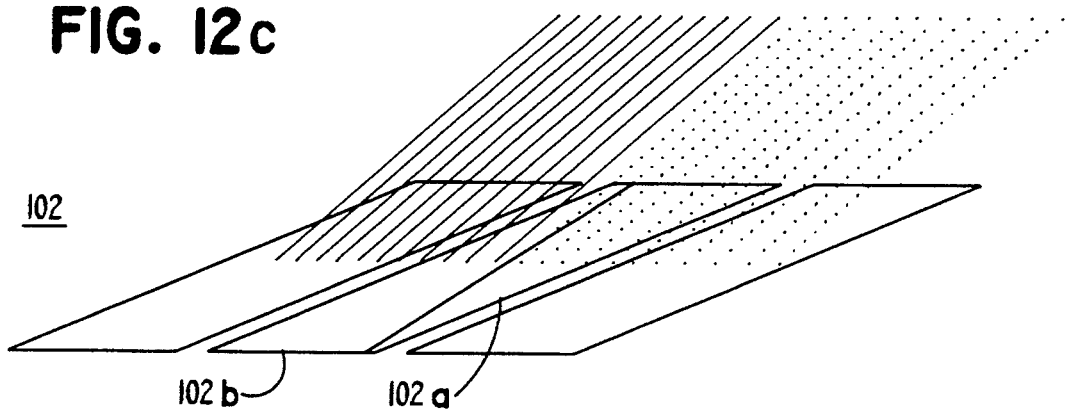
FIG. 12c is a magnified view of a portion of FIG. 12b.

The location of fan ray elements 132a, 132b, 134a and 134b can be determined with particular exactness, based upon the relative positions of the X-ray sources, the detectors and steel sample 16. As shown in FIG. 12b, a portion of fan beam 139 strikes the surface of sample 16 and is attenuated by sample 16 before reaching a portion of the detectors located below. Furthermore, a further portion of fan beam 139 is not attenuated by sample 16. Thus, this further portion of fan beam 139 is not attenuated when it reaches a portion of the detectors. Depending on the relative positions of the X ray sources, sample 16 and the detectors, a first portion 102a of at least one detector will receive a portion of fan beam 139 which has been attenuated by sample 16 and a second portion 102b of at least one detector will receive a portion of fan beam 139 which has not been attenuated. This is shown in FIG. 12c, which is an expanded view of a portion of FIG. 12b.

As previously stated, in accordance with the basic radiation absorption equation, as the amount of radiation which reaches a detector decreases, the value of $I_m/I_a$ for that detector also decreases. This is an exponential function. In addition, the horizontal position of sample 16 is exponentially related to $I_m/I_a$ for a particular detector. This is illustrated by FIG. 12d.

Figure 12D:
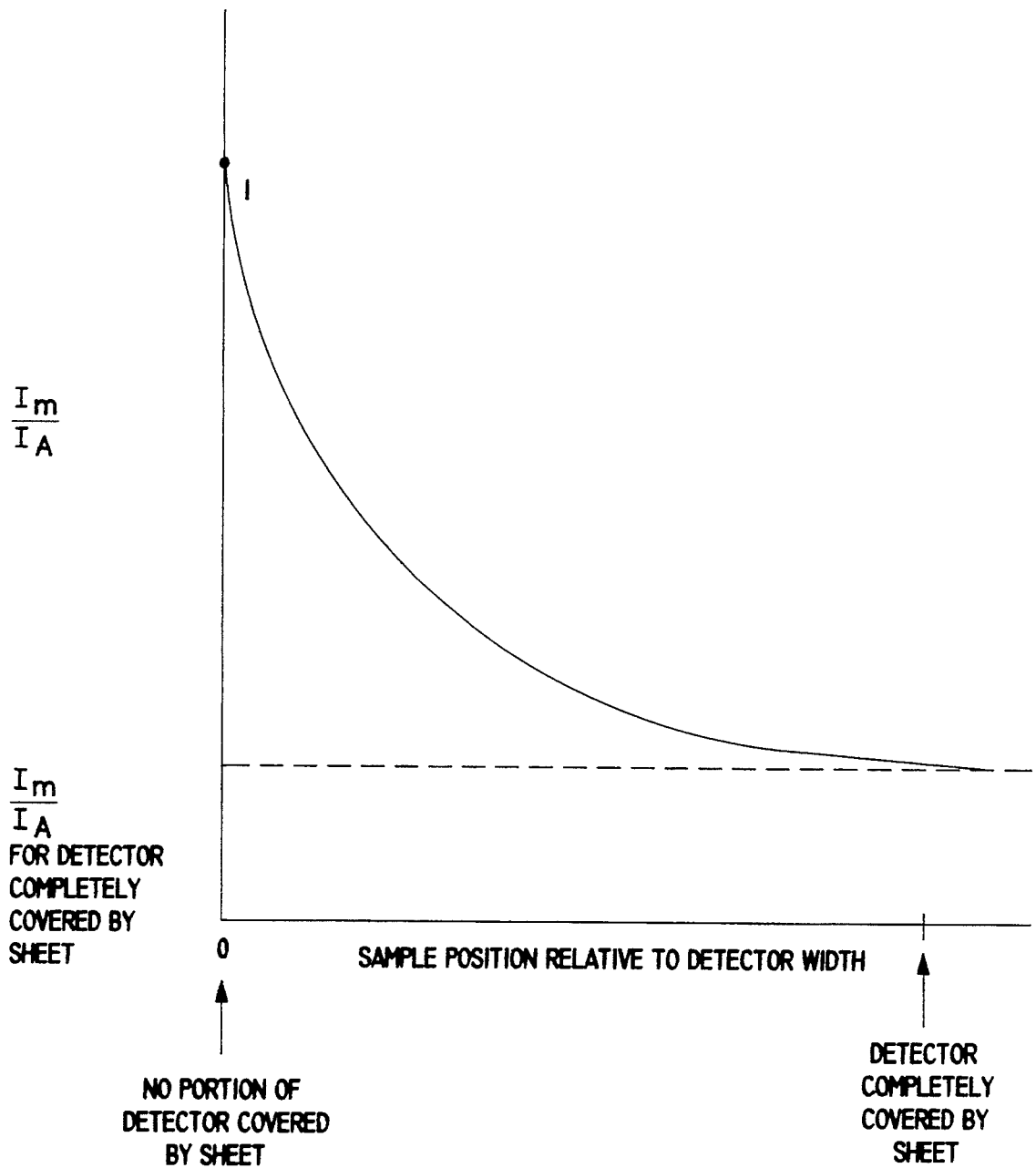
FIG. 12d is a graph which shows the relationship between the position of a sample relative to a detector surface and the value $I_m/I_a$ produced by that detector.

As shown in FIG. 12d, as sample 16 moves across a detector, the value of $I_m/I_a$ decreases. The value of $I_m/I_a$ continues to decrease until it reaches a minimum value for the particular sample 16. Thus, when the transmission of fan beam 139 towards a detector is partially obstructed by sample 16, the value of $I_m/I_a$ produced by that detector can be used to determine the location of an edge of sample 16 relative to that detector. Put another away, the value of $I_m/I_a$ for each detector can be used to precisely determine fan ray elements 132a, 132b, 134a and 134b in FIG. 12a.

If all the detectors are sufficiently skewed relative to the direction of sheet motion, the positioning of sample 16 may result in two adjacent detectors each receiving attenuated and non-attenuated radiation. In this manner, the value of $I_m/I_a$ for each detector can be compared to ensure correct detector operation.

Using the method described above with reference to FIGS. 12a–d, the location of sheet metal sample 16 relative to detectors 135 can be determined by measuring the intensity of the radiation reaching each detector.

For example, by measuring the level of attenuated radiation reaching each detector of detectors 135, fan rays 132a, 132b, 134a and 134b, can be determined as described above. Having identified fan rays 132a, 132b, 134a and 134b, the points of interception of these fan rays can be determined. Having determined the points of interception, the location in space of the sheet metal sample 16 can be determined. Having determined the location in space of the edges of sheet metal sample 16, the width of sheet metal sample 16 is readily determined.

Figure 13:
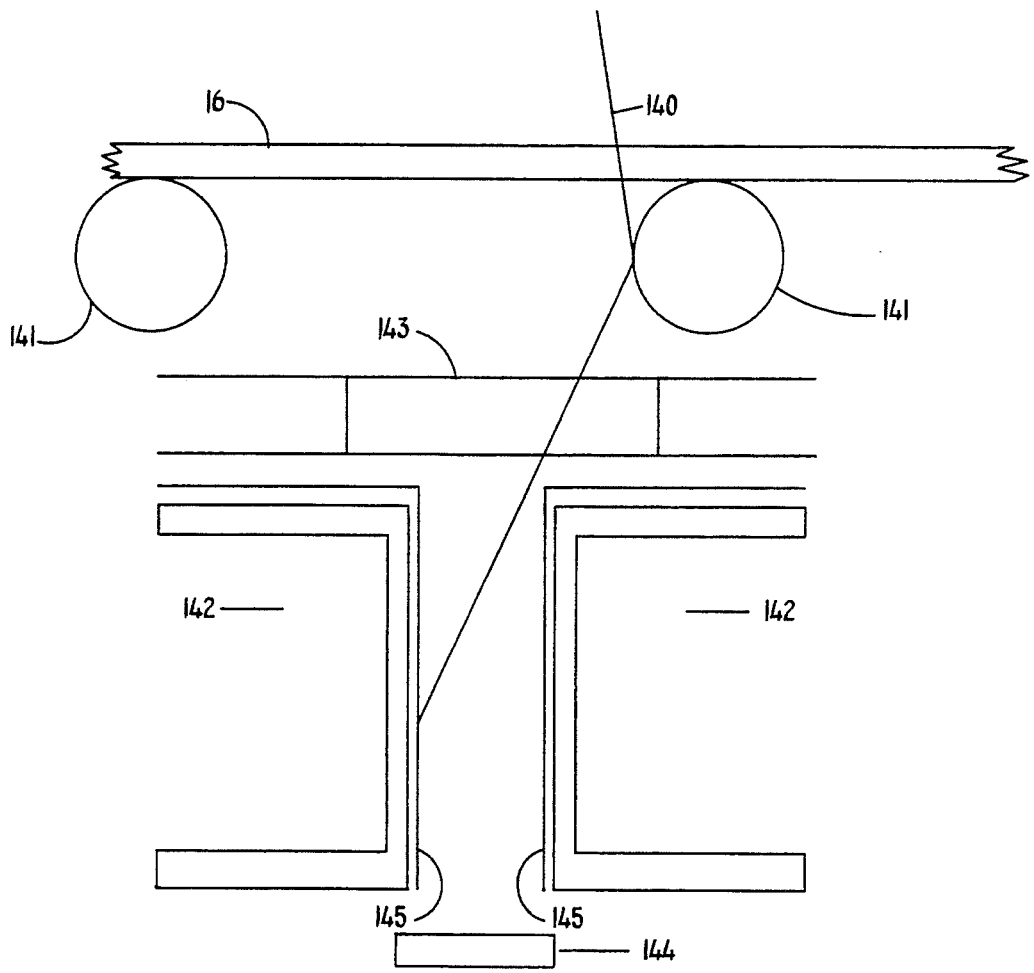
FIG. 13 is a cross-sectional view showing the partial internal construction of the detector enclosure.

As shown in FIG. 13, the sheet metal is supported by a plurality of metallic rollers 141 as the sheet metal travels over the detectors 144. Unfortunately, as the fan ray elements (e.g. 140) strike the rollers, a plurality of scattered fan ray elements (e.g. 140') may result. These scattered beams may reach the scintillation detectors and cause erroneous results. To prevent this from occurring, as shown in FIG. 13, several walls 142 are positioned between the titanium window 143 and the scintillation detectors 144. These walls form a collimator which prevents fan ray elements (e.g. 140'), scattering off of rollers 141, from reaching the scintillation detectors 144. The scintillation detectors 144 are positioned below the large channels which are lined on their top and sides with lead layers 145. Thus, if X-ray beams are scattered off of the rollers 141 or steel sample 16, the X-ray beams are absorbed by the lead coating 145 instead of reaching the scintillation detector 144. This minimizes scattered fan ray elements from reaching the scintillation detectors 144 and producing erroneous signals.

Figure 14:
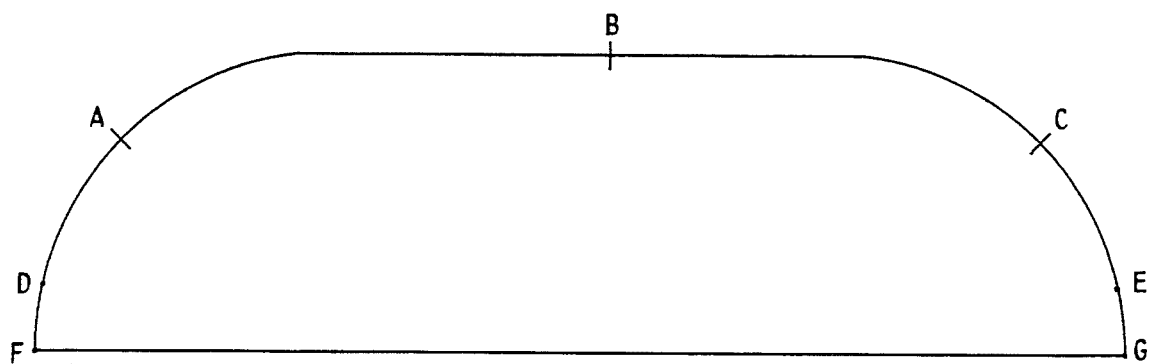
FIG. 14 is an exaggerated plot of the thickness of a metal sample which is useful for describing how crown and wedge are determined.

As previously stated, a variety of parameters relating to the sheet metal can be determined. This is illustrated by FIG. 14. FIG. 14 is an exaggerated plot of the thickness of a steel sample. The curvature of the sheet near the sheet edges is exaggerated in the Figure for purpose of explanation. As shown in this Figure, the center of the sheet is indicated by reference letter B. Reference letters F and G indicate the true edges of the sheet. Reference letters D and E are located ¾ of an inch from the edge of the sheet. Reference letters A and C are located two inches from the edge of the sheet. By determining the intensity of the incident X-ray beam as previously described in accordance with equation 2, it is possible to determine the thickness of a manufactured sheet at any point. Thus, it is possible to measure the thickness of the manufactured sheet at points D, B and E.

Using the present invention, it is possible calculate the crown and wedge in accordance with equations 3 and 4 as follows:

Crown=Thickness at Point B−((Thickness at Point D+Thickness at E)/2)   (3)

Wedge=Thickness at point E−Thickness at Point D   (4)

In order to determine sample thickness in accordance with equation 2, a separate $\mu$ is calculated for several types of materials which will be measured. This is determined as described below with reference to FIG. 15 and FIG. 16.

$\mu$ is different for different steel samples, depending on the absorption characteristics of the particular sample. The absorption characteristics of a sample are dependent, in turn, on the chemical (e.g. carbon) composition of the particular sample. Thus, $\mu$ is determined for each type of steel to be measured. By determining $\mu$, and measuring $I_m$ and $I_a$ as described above, the thickness of a particular steel sample can be determined.

In order to determine $\mu$, precisely measured steel samples are placed within the X-ray beam. This is accomplished using the auto calibration subassembly, as described above with reference to FIGS. 4 and 5. Thus, because the thickness of the sample is precisely known, and $I_m$ and $I_a$ can be measured, $\mu$ for sheet steel having a composition and thickness identical to the steel sample can be determined.

Using the procedure described above, $\mu$ can be determined for sheet steel having an identical composition but a non-identical thickness to the steel sample. However, to determine the dimensions of a steel sample of non-identical thickness, the phenomena of beam hardening is desirably considered. This is explained below.

Figure 15:
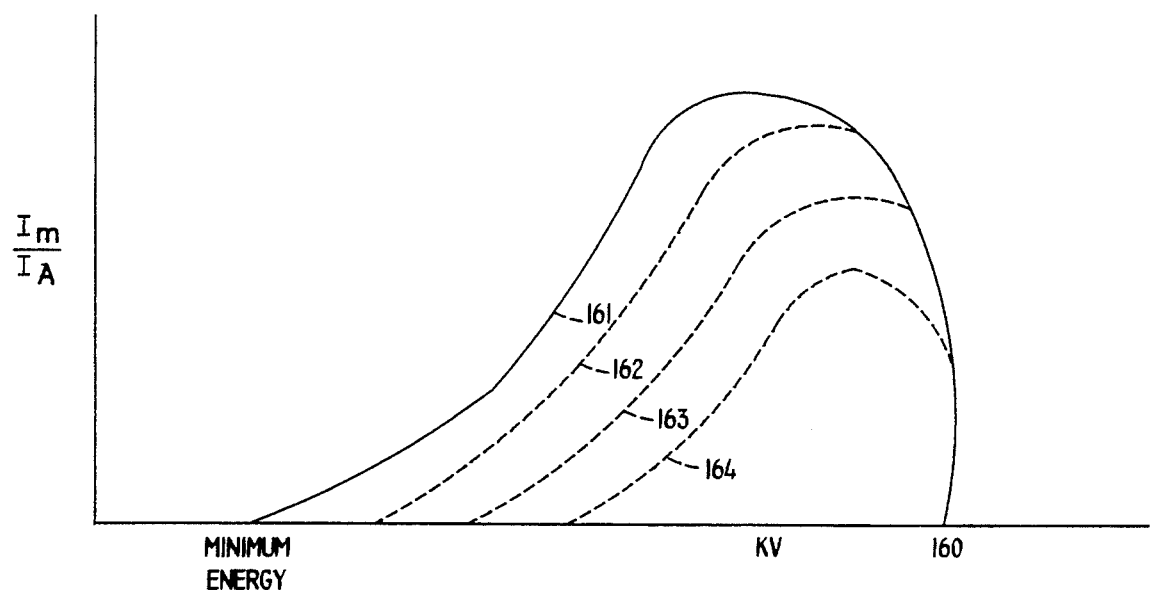
FIG. 15 is a graphical representation of the ratio of the intensity of X-rays through several metal samples to the intensity of X-rays in air as a function of the energy content of individual X-rays penetrating the metal samples.

In an exemplary embodiment of the present invention, the X-ray beam which is being used is not monochromatic. That is to say, when the X-ray beam is radiating sheet steel, X-rays of a plurality of energy levels will illuminate the steel. This is shown with reference to FIG. 15. In FIG. 15, the X axis represents increasing energy of the X-ray beams reaching the detectors (measured in kilovolts) and the Y axis represents an increasing ratio of $I_m$ to $I_a$. Furthermore, the X-ray beam is operating with a maximum X-ray energy of 160 kilovolts reaching the detectors.

If the X-ray beams are travelling through air, X-rays which reach the detectors have a distribution of energies as represented by the area underneath curve 161. As shown, X-rays with energies below a certain minimum energy value do not reach the detectors. These X-rays are absorbed by other materials within the beam (e.g. the X-ray tube window).

If a first relatively thin steel sample is placed within the X-ray beam, a small amount of radiation is absorbed. However, more lower energy X-rays than higher energy X-rays are absorbed by the first steel sample. Thus, if the X-rays are travelling through this first sample, X-rays which reach the detectors have a distribution of energies as represented by the area underneath curve 162.

If a second steel sample having a medium thickness is placed within the X-ray beam, a larger amount of radiation is absorbed than by the first sample. Again, more of the lower energy X-rays are absorbed than of the higher energy X-rays. Thus, X-rays reaching the detectors through the second sample have a distribution of energies as represented by the area underneath curve 163.

If a third relatively thick steel sample is placed within the X-ray beam, X-rays which reach the detectors have a distribution of energies as represented by the area underneath curve 164.

Figure 16:
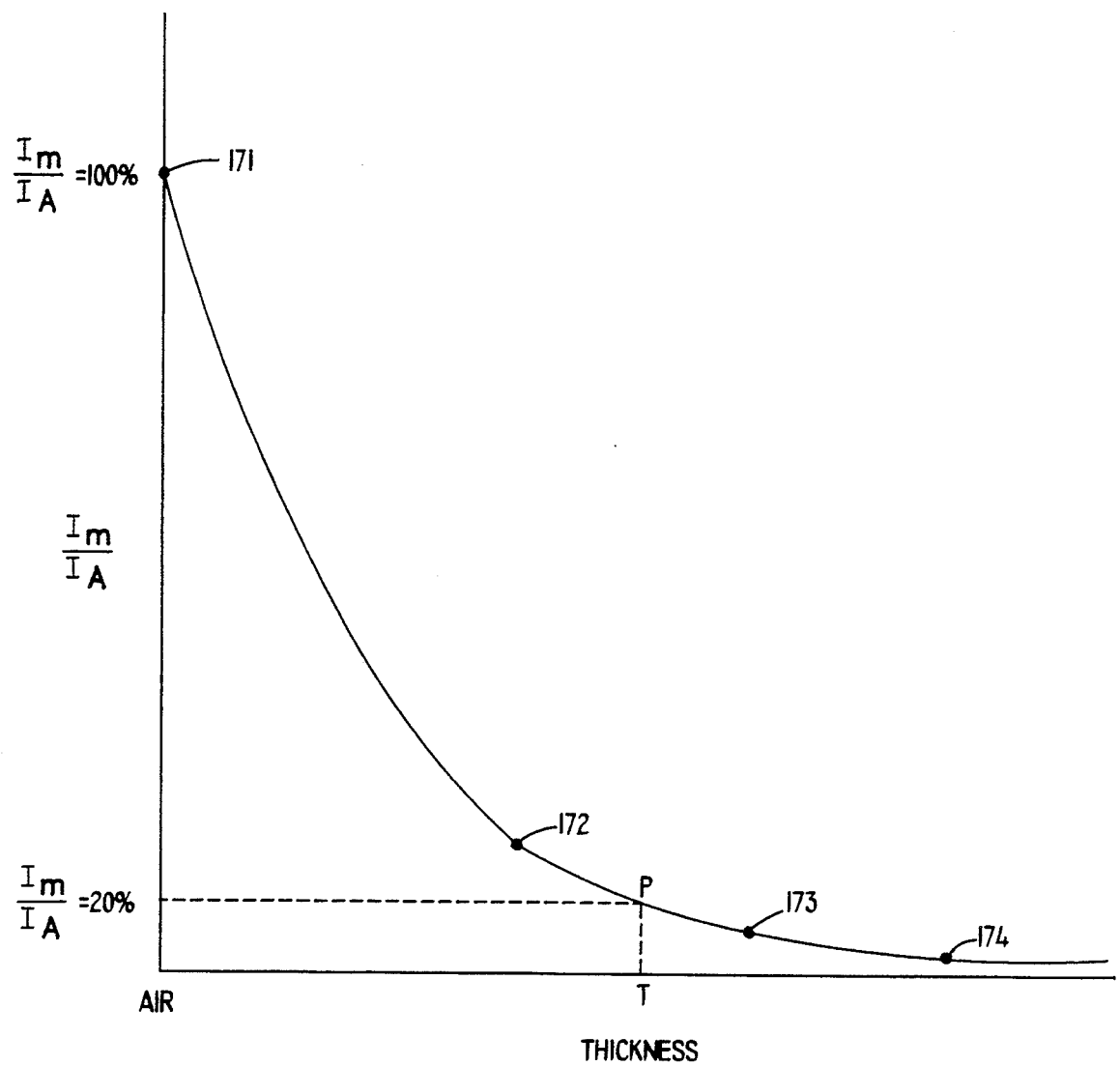
FIG. 16 a graphical representation of the ratio of the intensity of X-rays through a metal sample to the intensity of X-rays through air as a function of the thickness of the metal sample.

Because X-rays of several energies reach the detectors, the attenuation levels determined by the detectors require compensation. This is referred to as beam hardening compensation. Beam hardening compensation is accomplished as follows. The ratio of $I_m$ to $I_a$ is determined for at least three steel samples of precisely known thicknesses (e.g. thin, medium and thick). This information may be plotted on a graph as shown in FIG. 16. In FIG. 16, increasing thickness of the measured steel is shown along the X axis. Increasing ratio of $I_m$ to $I_a$ is shown along the Y axis. Air is indicated on this graph at point 171—the thickness of air is zero and the ratio of $I_m$ to $I_a$ is one (or 100%). The ratio $I_m$ to $I_a$ for the three samples of increasing thickness is indicated at points 172–174, respectively.

Having determined the data points for the three samples and for air, a curve may be fitted to these points. By fitting a curve to these points, a correlation is obtained between any $I_m/I_a$ ratio and any thickness. Thus, for example, assume that the curve shown in FIG. 16 has been generated for a particular composition of steel, and $I_m$ and $I_a$ for a particular sample has been measured to have a ratio of 20%. The line length through the sample will then have the value T along the X axis corresponding the generated curve at the point P where this curve has a value along the Y axis of 20%.

A further difficulty in measuring the dimensions of a particular sample is caused by radiation scatter. As fan ray elements intersect the steel sample, several of these fan ray elements are deflected by the steel sample. This results in undesirable scatter ray elements which, when detected by the detectors, cause erroneous detector readings. The erroneous readings, in turn, may be corrected by multiplying the determined line length by a scatter correction factor. The scatter correction factor (SF) may be determined in accordance with equation 5:

$$SF = 1.0155 - 0.00031 * ((\text{left } Z + \text{right } Z)/2 - \text{passline}) \quad (5)$$

where:
left $Z$ = height of left sheet edge above detectors
right $Z$ = height of right sheet edge above detectors
passline = height of top surface of rollers above detectors This equation was empirically derived.

Using a passline = 33.4 and a center z (as the average sheet height) = ((left z + right z)/2) the following simplified equation is obtained:

$$SF = 1.02585 - 0.00031 * \text{center } z \quad (6)$$

Using equation 6, a scatter correction factor can be calculated, which can in turn be applied to the line lengths determined by the detectors.

Figure 17A:
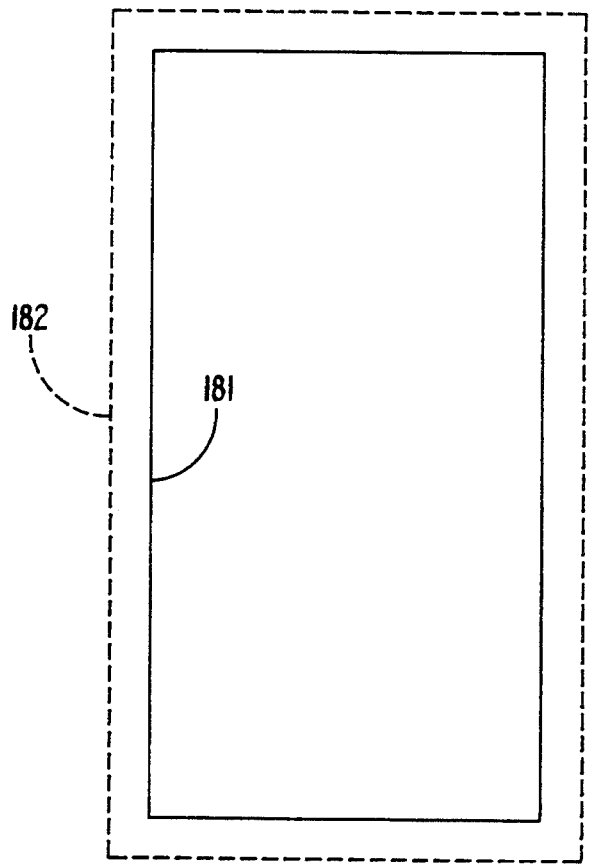
FIGS. 17a and 17b are a top view and a side view, respectively, of a sheet metal sample in a heated and a non-heated state.
Figure 17B:
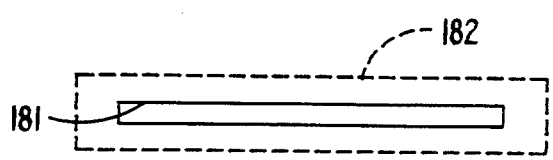

Still a further difficulty in measuring the dimensions of a particular hot sample is caused by the temperature of the sheet steel sample. This is described with reference to FIG. 17a, which is a top view of a sheet steel sample, and FIG. 17b which is a side view of a sheet steel sample. As shown in FIGS. 17a and 17b, as a sheet steel sample is heated, the measurements of the sample increase from a first set of dimensions 181 to a second set of dimensions 182. FIGS. 17a and 17b significantly exaggerate this dimensional increase for explanatory purposes. Furthermore, as the dimensions increase, the density of the sheet steel sample decreases. Thus, to determine the dimensions of the sheet steel sample when cold, it is desirable to apply a correction factor to the measurements taken when the sheet is hot.

Figure 18A:
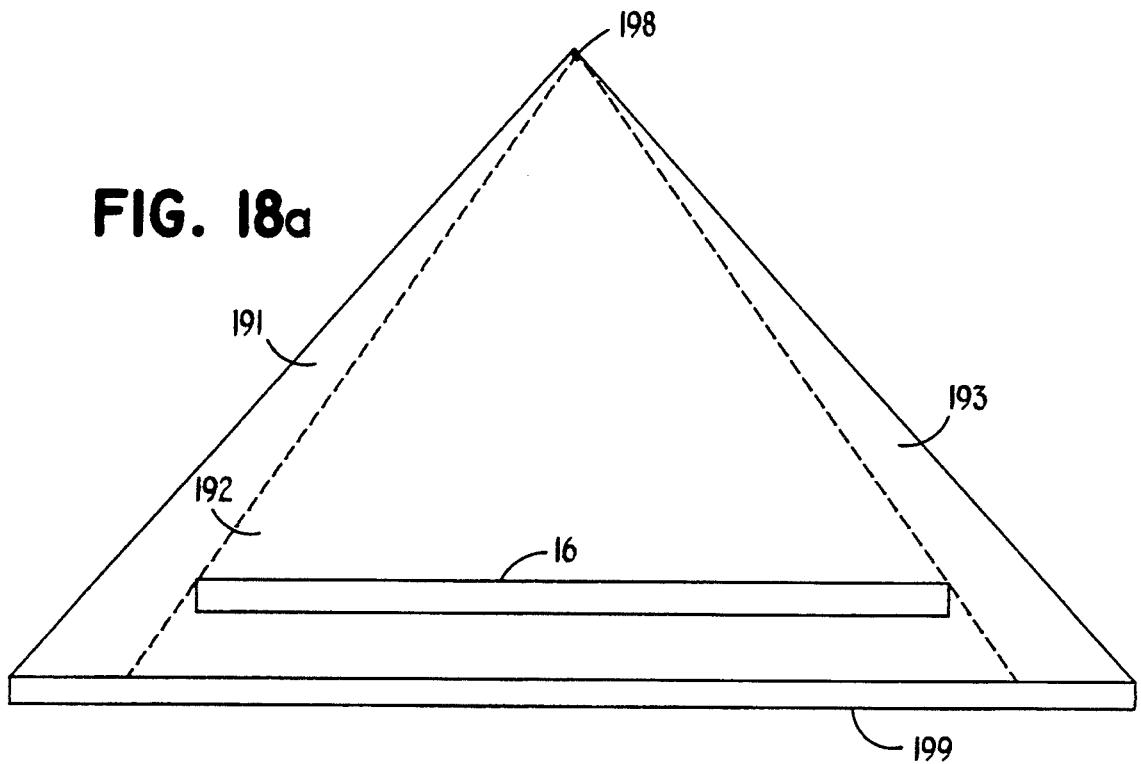
FIGS. 18a and 18b are cross-sectional views of a metal rolling line which shows a metal sample in a non-heated and heated state, respectively, in conjunction with an X-ray source and a detector arrangement.
Figure 18B:
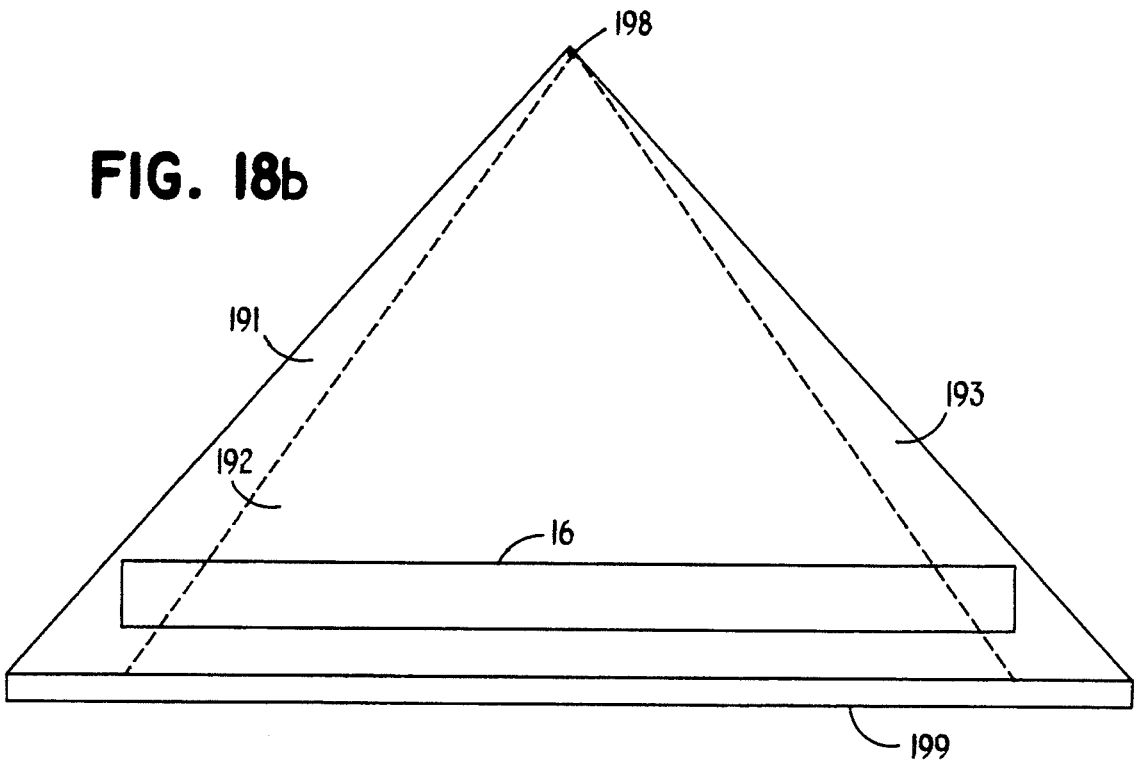

Correction of the obtained dimensions are better understood with reference to FIGS. 18a and 18b. FIG. 18a shows sheet steel sample 16 at room temperature. FIG. 18b shows sheet steel sample 16 in a heated stale.

In FIG. 18a, a plurality of fan rays are shown being transmitted from the source 198 to the detectors 199. While a large number of fan rays (shown in regions 191, 192 and 193) actually reach the detectors 199, only a fractional number of these fan rays (shown in region 192) intercept sheet steel sample 16. Thus, as shown in FIG. 18a, the fan rays in regions 191 and 193 do not intercept sheet steel sample 16.

In FIG. 18b, a plurality of fan rays are also shown being transmitted from the source 198 to the detectors 199. However, in FIG. 18b, sheet steel sample 16 is in a heated state, thus causing the sheet steel sample 16 to expand. FIG. 18b significantly exaggerates this expansion for explanatory purposes. Because sheet steel sample 16 is in an expanded state, sheet steel sample 16 now occupies a portion of regions 191 and 193. Furthermore, the distance from the top of sheet steel sample 16 to the bottom of sheet steel sample 16 increases. Both of these effects cause the density of sheet steel sample 16 to decrease.

To account for thickness changes resulting from temperature variations, a correction factor is applied to determined thickness values. Exemplary correction factors are described in E. L. Mangan, et al., *X-Ray Thickness Gages for Bethlehem Steel's Computer Controlled Hot Strip Mills*, Iron and Steel Engineer, Vol. 48, No. 5, pages 47-53, herein incorporated by reference. To account for changes in edge location resulting from temperature variations, a correction factor may be used.

In order to correct the detector output signals for temperature based variations in the steel dimensions, the temperature of the steel must be determined. In order to determine the steel temperatures, one or more pyrometers may be used.

In an exemplary embodiment of the present invention, two pyrometers are used to perform the temperature measurements. The first pyrometer is referred to as a centerline pyrometer. The centerline pyrometer may be a standard radiation type pyrometer. An exemplary centerline pyrometer is an Ircon pyrometer. The second pyrometer is referred to as a linear array pyrometer. An exemplary linear array pyrometer is a Chino pyrometer. The centerline pyrometer detects levels of thermal energy radiating from a relatively small spot at the center of a sheet steel sample. In an exemplary embodiment of the present invention, the linear array pyrometer detects levels of thermal energy radiating from approximately fifteen hundred places across the widest sheet. In a further exemplary embodiment of the invention, the widest sheet is over sixty inches in width. Thus, using the linear array pyrometer, the temperature radiating from a sheet may be detected a 0.04 inch intervals. After calibrating the centerline pyrometer (a relatively simple task), the temperature at the center of the sheet is determined using the centerline pyrometer and the linear array pyrometer. Because the linear array pyrometer is not easily calibrated, the measurements obtained using the centerline pyrometer and the linear array pyrometer are compared, and a ratio of the measurements obtained using the two pyrometers is generated. This ratio is used as a correction factor which is applied to the measurements obtained by the linear array pyrometer across the entire width of the sheet steel sample.

Because the temperature detection elements within the linear array pyrometer are smaller than the radiation detector elements, several temperature detection elements are used for the area which corresponds to a single detector element. Using all of the temperature detection elements which are situated between the two opposing edges of a sheet steel sample, an average temperature across the sample is generated. This average temperature is used to correct for edge position variations due to thermal expansion as described above.

It will be understood that the measurements described above may be made to any portion of the sheet steel sample. This fact is particularly relevant at the point where manufacture of the sheet steel sample has just completed. After the sheet steel sample has reached the final stages of manufacturing, the sheet steel sample moves on rollers, over the detectors, before it is caught on a coiler. The coiler configures the completed sheet steel sample into a large roll. Although the completed sheet steel sample is approximately maintained in a constant vertical position relative to the detectors after the sheet steel sample has been caught by the coiler, the sheet steel sample is prone to extreme vertical fluctuation relative to the detectors before engagement of the sheet steel sample with the coiler is achieved.

Because of the manner in which edge detection is performed in the exemplary embodiment of the present invention, the positional fluctuations described may be irrelevant. Assuming that choppers are being used which rotate at a rate of 1500 RPM, each chopper rotates at a rate of 25 revolutions per second or one revolution in 0.04 second. As each chopper includes eight sectors, each chopper allows the sample to be irradiated at intervals of 0.005 seconds. Because the two choppers alternate in their allowance of radiation therethrough, the sample is irradiated by both X-ray sources in 0.01 second.

Using the method described above with reference to FIG. 12a–c, the attenuation of the X-rays illuminating sample 16 can be analyzed to locate those X-rays intercepting the sample edges. The position of those X-ray rays can then be triangulated to determine the orientation and edge position of sample 16. Thus, the edge position of sample 16 can be determined regardless of the orientation of sample 16. Furthermore, having determined the orientation of sample 16, the thickness of sample 16 can be determined. This is accomplished using simple trigonometry to normalize thickness calculations and in accordance with the method described above with reference to Equation 2.

An additional difficulty in measuring the dimensions of a particular sample is caused by curling of the sample. This curling may occur over small portions of the sample. Alternately, this curling may occur over large sample areas. In order to determine if sample curling has occurred, the edge points of the sample are initially located. Subsequent measurements are made using two fan ray elements which are assumed to intersect at the midthickness line (i.e. the locus of midpoints between the top and bottom surfaces) of sample 16 (in an assumed flat orientation). Using these measurements, curling of a portion of sample 16 may be determined.

Figure 19A:
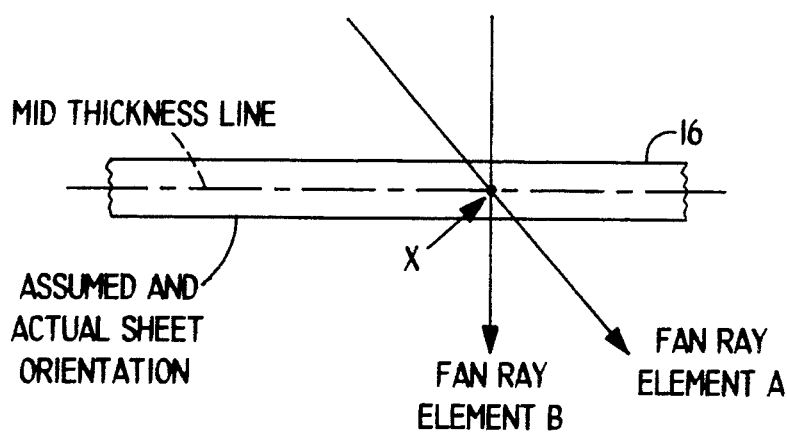
FIGS. 19a–19c are graphical representations of the intersection of fan ray elements with a metal sample in a variety of orientations.
Figure 19B:
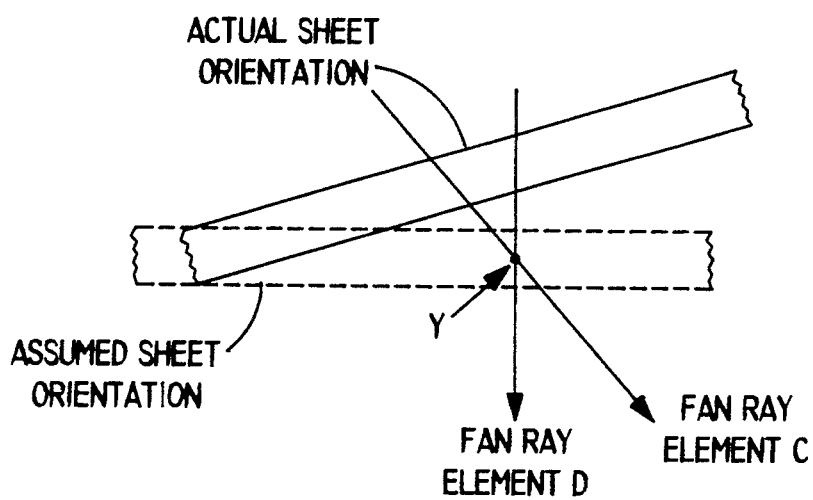
Figure 19C:
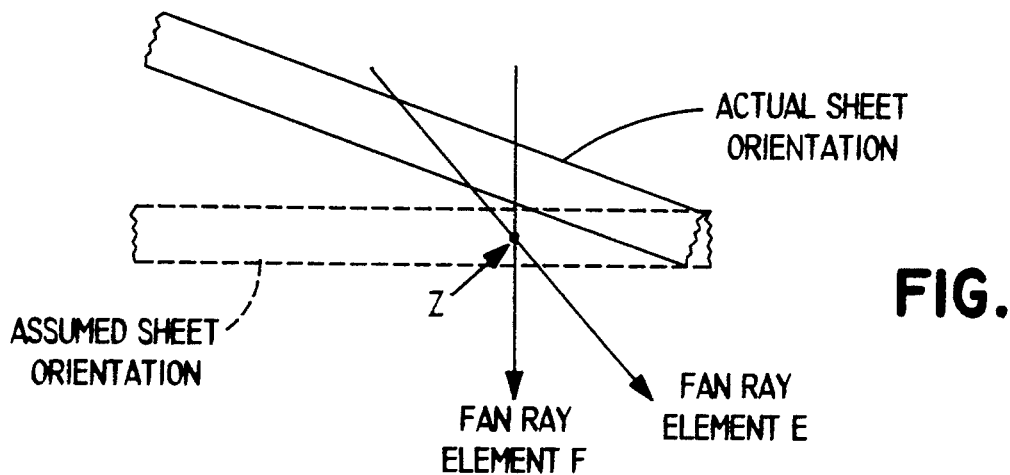

The process of determining if curling of a portion of sample 16 has occurred is illustrated by FIGS. 19a, 19b, and 19c.

In the example illustrated by FIG. 19a, fan ray element A and fan ray element B are assumed to intersect and actually do intersect at point x. Thus, in FIG. 19a, because sample 16 is actually flat (i.e. no curling and no curvature), computations based upon either fan ray element A or fan ray element B will result in substantially identical thickness determinations for sample 16 at point x.

In the example illustrated by FIG. 19b, fan ray element C and fan ray element D are assumed to intersect at point y. However, in FIG. 19b, the portion of sample 16 about point y is actually tilted somewhat counterclockwise relative to the remainder of the sample. Thus, if fan ray elements C and D are used for sample thickness computations based on the true edge locations of a sheet which is assumed to be completely flat, the thickness at point y as determined by fan ray element C will be less then the thickness at point y as determined by fan ray element D. By obtaining a thickness result with fan ray element C which is less than the thickness result obtained with fan ray element D, it is apparent that the portion of sample 16 about point y is tilted counterclockwise relative to the remainder of the sample.

In the example illustrated by FIG. 19c, fan ray element E and fan ray element F are assumed to intersect at point z. However, in FIG. 19c, the portion of sample 16 about point z is actually tilted somewhat clockwise relative to the remainder of the sample. Thus, if fan ray elements E and F are used for sample thickness computations based on the true edge locations of a sheet which is assumed to be flat, the thickness at point z as determined by fan ray element E will be greater then the thickness at point z as determined by fan ray element F. By obtaining a thickness result with fan ray element E which is greater than the thickness result obtained with fan ray element F, it is apparent that the portion of sample 16 about point z is tilted clockwise relative to the remainder of the sample.

By comparing any two thickness values obtained for a sample at an individual assumed point, the amount of curvature at that point can be determined based upon basic mathematical (e.g. trigonometric) principles.

The dimensions of a sheet steel sample undergoing vertical fluctuations can also be determined in embodiments of the present invention in which choppers are not used. As previously stated, in a further exemplary embodiment of the present invention, each x-ray source is directed toward a different area beneath sample 16. In that embodiment, the dimensions of vertically fluctuating sample 16 may be determined by simply limiting the time period over which detector output is used for dimensional determinations. For example, detector output over 5 milliseconds (the time period also desirably used with a chopper assembly) may be used in a chopperless system for dimensional determinations.

Additional dimensions for sample 16 may be determined based upon the aforementioned data determinations. These dimensions include, but are not limited to sheet width, ridge detection, groove detection and profile skews. In addition, the existence of edge wave can be determined based upon the detection of fluctuations in the location of the edges of sample 16. Additional dimensions can readily be determined for a particular material by one appropriately skilled in the art.

While the invention has been described with reference to a sheet metal sample, it is understood that the sample can be a variety of materials, in addition to or in place of metals. Furthermore, the sample need not necessarily be a sheet. Thus, while the measured sample may comprise a metal (such as steel, copper, bronze or iron), it is possible that the measured samples may comprise nonmetallic substances, such as plastics, ceramics, rubber, etc.

Thus, an apparatus and method are disclosed for accurately measuring edge profile and thickness of a sample steel sheet. In particular, having determined the edge profile and thickness measurements as described above, sheet width, wedge and crown are accurately obtained.

While the invention has been described in terms of an exemplary embodiment, it is contemplated that it may be practiced as outlined above with modifications within the spirit and scope of the appended claims.

What is claimed:

1. A method of determining the dimensions of an object having a left edge and a right edge, said method comprising the steps of:
    a) generating a plurality of fan shaped beams of radiation from a respective plurality of distinct stationary physical locations, wherein each one of said plurality of fan shaped beams is divided into a plurality of fan ray elements;
    b) alternately directing each one of said plurality of fan shaped beams towards said object and respective ones of a plurality of detectors, wherein each one of said plurality of fan shaped beams penetrates said object from said left edge of said object to said right edge of said object;
    c) detecting several fan ray elements from each of said plurality of fan shaped beams, said several fan ray elements being detected by the plurality of detectors;
    d) producing a plurality of data signals corresponding to said detected fan ray elements;
    e) correlating each of said plurality of data signals with a physical location corresponding to a respective one of said plurality of detectors to determine the dimensions of the object.

2. The method of claim 1 wherein each of said produced plurality of data signals corresponds to the attenuation of a different one of said detected fan ray elements at a known coordinate and step e) includes the step of triangulating ones of said detected fan ray elements to determine the dimensions of the object.

3. The method of claim 1, wherein at least one of said left edge of said object and said right edge of said object are substantially parallel to an axis along which said object moves.

4. The method of claim 1, wherein each of said plurality of fan shaped beams is generated entirely from one of one side of said object and another side of said object and each of said fan ray elements is detected by the plurality of detectors entirely from one of another side of said object and one side of said object.

5. A method of determining the dimensions of an object having a left edge and a right edge, said method comprising the steps of:
    a) generating each of a plurality of fan shaped beams of radiation from a respective distinct stationary physical location, wherein each fan shaped beam is divided into a plurality of fan ray elements;
    b) directing each of said plurality of fan shaped beams entirely from one of one side of said object and another Side of said object toward said object and a plurality of detectors included in a respective one of a plurality of detector banks each situated entirely on one of another side of said object and one side of said object, wherein each of said plurality of fan shaped beams penetrates said object from said left edge of said object to said right edge of said object;
    c) detecting several fan ray elements from each of said fan shaped beams, said several fan ray elements detected by the plurality of detectors included in each of said plurality of detector banks;
    d) producing a plurality of data signals corresponding to said detected fan ray elements;
    e) correlating said plurality of data signals with a physical location corresponding to a respective one of said plurality of detectors included in said respective one of said plurality of detector banks to determine the dimensions of the object.

6. The method of claim 5, wherein each of said produced plurality of data signals corresponds to the attenuation of a different one of said detected fan ray elements at a known coordinate and step e) includes the step of triangulating ones of said detected fan ray elements to determine the dimensions of the object.

7. The method of claim 1, wherein at least one of said left edge of said object and said right edge of said object are substantially parallel to an axis along which said object moves.

8. A system for determining the dimensions of an object having a left edge and a right edge, said system comprising:
    a plurality of fan ray sources, each transmitting a plurality of fan rays from a respective plurality of stationary locations toward the object;
    detection means, including a plurality of detectors, for detecting several fan rays from each of said fan ray sources, wherein each of said fan ray sources directs fan rays towards said object and selected ones of said plurality of detectors, and wherein each of said plurality of fan shaped beams penetrates said object from said left edge of said object to said right edge of said object;

data means for producing a plurality of data values, each corresponding to the intensity of ones of said detected fan rays;

data processing means for processing a plurality of said data values to determine the dimensions of the object.

9. The system of claim 8, wherein at least one of said data values indicates that a corresponding fan ray has been attenuated by said object.

10. The system of claim 8, further including collimator means coupled to said plurality of fan ray sources for forming a beam of fan rays.

11. The system of 10, further comprising further collimator means, coupled to said detection means, for significantly reducing the probability that a scattered ray formed by the intersection of one of said plurality of fan rays with said object will reach said detection means.

12. The system of claim 8, further including calibration means coupled to said detection means for calibrating the detection means.

13. The system of claim 12, wherein the calibration means comprises a plurality of objects selectively positioned between each of said plurality of fan ray sources and said detection means, each of said objects attenuating each fan ray by a known amount as each fan ray is transmitted through each of said objects.

14. The system of claim 8, wherein each detector comprises:
scintillation means;
a photomultiplier tube optically coupled to the scintillation means.

15. The system of claim 14, wherein each detector comprises:
an amplifier coupled to the photomultiplier tube;
an analog/digital (A/D) converter coupled to the amplifier.

16. The system of 14, wherein each detector further comprises a light pipe coupling the scintillation means to the photomultiplier tube.

17. The system of claim 8, wherein each detector of said plurality of detectors is encased in a structure including a window, said window comprising titanium.

18. The system of claim 8, wherein the detectors are positioned at an oblique angle to a direction of motion of said object wherein each of said detectors has a top surface which is positioned parallel to the object.

19. The system of claim 8 wherein a scattered ray, formed by the intersection of one of said plurality of fan rays with said object, is detected by said detection means and an erroneous data value is generated by said data means responsive to the detection of said scattered ray, further comprising scatter correction means for correcting said erroneous data value.

20. The system of claim 8, wherein at least one of said left edge of said object and said right edge of said object are substantially parallel to an axis along which said object moves.

21. The system of claim 8, wherein each of said stationary locations is situated entirely on one of one side of said object and another side of said object and each of said plurality of detectors is situated entirely on one of another side of said object and one side of said object.

22. Apparatus for use in a steel mill for determining the dimensions of a steel sample having a left edge and a right edge, said apparatus comprising:

a plurality of fan ray radiation sources, each transmitting a fan shaped beam which includes a respective plurality of fan rays toward same steel sample from a respective plurality of fixed physical locations, each fan shaped beam from each of said plurality of fan ray radiation sources penetrating said steel sample from said left edge to said right edge;

detection means, including a plurality of detectors, for detecting several fan rays from each of said radiation sources, and for producing a plurality of data values corresponding to said plurality of fan rays, wherein each of said radiation sources directs fan rays towards said detectors;

data processing means for processing selected ones of said plurality of data values to determine the dimensions of said steel sample.

23. The apparatus of claim 22, wherein said selected ones of said plurality of data values correspond to ones of said plurality of fan ray sources which are partially attenuated by the edges of said steel sample.

24. The apparatus of claim 22, wherein at least one of said data values indicates that a corresponding fan ray has been attenuated by said steel sample.

25. The apparatus of claim 22, wherein each of said detectors are positioned at an oblique angle relative to the direction of movement of said steel sample in a plane parallel to said steel sample.

26. The apparatus of claim 22, wherein said steel sample includes a left edge and a right edge, said data processing means comprising:

means for spatially locating a first fan ray element transmitted between a first of said plurality of fan ray sources and said detection means and to determine at least one of said plurality of data values, said first fan ray intersecting said left edge of said steel sample;

means for spatially locating a second fan ray element located between a second of said plurality of fan ray sources and said detection means and to determine at least one of said plurality of data values, said second fan ray intersecting said left edge of said steel sample;

means for spatially locating a third fan ray element located between said first of said plurality of fan ray sources and said detection means and to determine at least one of said plurality of data values, said third fan ray intersecting said right edge of said steel sample; and means for spatially locating a fourth fan ray located between said second of said plurality of fan ray sources and said detection means and to determine at least one of said plurality of data values, said fourth fan ray intersecting said right edge of said sheet metal sample.

27. The apparatus of claim 26, wherein said data processing means further comprises:

means for triangulating said first fan ray element and said second fan ray element in order to spatially locate the left edge of said steel sample;

means for triangulating said third fan ray element and said fourth fan ray element in order to spatially locate the right edge of said steel sample; and means for processing the spatial location of said left edge of said steel sample and the spatial location of said right edge of said steel sample in order to determine the width of said steel sample.

28. The apparatus of claim 27, wherein said data processing means further comprises:
thickness determination means for determining the thickness of said steel sample at least at one of a plurality of locations on said steel sample relative to at least one of said left edge of said steel sample and said right edge of said steel sample.

29. The apparatus of claim 28, wherein said thickness determination means includes means for determining sample curling by measuring thickness of said steel sample based on the attenuation of a fan ray element, measuring thickness of said steel sample based on the attenuation of a further fan ray element which is assumed to intersect said fan ray element at a point inside said steel sample, and comparing said measured thicknesses.

30. The apparatus of claim 27 wherein the thickness of said steel sample at least at one of a plurality of locations on said steel sample, the thickness of said steel sample near said left edge of said steel sample and the thickness of said steel sample near said right edge of said steel sample is used to determine a crown measurement of said steel sample.

31. The apparatus of claim 27 wherein the thickness of said steel sample at least at one of a plurality of locations on said steel sample, the thickness of said steel sample near said left edge of said steel sample and the thickness of said steel sample near said right edge of said steel sample is used to determine a wedge measurement of said steel sample.

32. The apparatus of claim 27, further comprising edge wave detection means for determining edge wave in said steel sample based upon the spatial location of said left edge of said steel sample and the spatial location of said right edge of said steel sample at a plurality of times.

33. The apparatus of claim 22, wherein said steel sample makes contact with and is then coiled onto a coiler, and said data processing means processes each data value to determine the dimensions of said sheet steel sample prior to said steel sample making contact with said coiler.

34. The apparatus of claim 22, further comprising:
thermal mapping means for determining a thermal profile for said steel sample; and
further data processing means for processing selected ones of said plurality of data values and said thermal profile to determine at least one of said plurality of dimensions for said steel sample at a predetermined temperature.

35. Apparatus of claim 22, wherein at least one of said left edge of said steel sample and said right edge of said steel sample are substantially parallel to an axis along which said steel sample moves.

36. Apparatus of claim 22, wherein each of said stationary locations is situated entirely on one of one side of said steel sample and another side of said steel sample and each of said plurality of detectors is situated entirely on one of another side of said steel sample and one side of said steel sample.

* * * * *